US010788680B2

(12) United States Patent
Minamisawa et al.

(10) Patent No.: US 10,788,680 B2
(45) Date of Patent: Sep. 29, 2020

(54) OPTICAL UNIT WITH SHAKE CORRECTION FUNCTION

(71) Applicant: NIDEC SANKYO CORPORATION, Nagano (JP)

(72) Inventors: Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 128 days.

(21) Appl. No.: 15/972,237

(22) Filed: May 7, 2018

(65) Prior Publication Data

US 2018/0321506 A1   Nov. 8, 2018

(30) Foreign Application Priority Data

May 8, 2017   (JP) .................................. 2017-092234

(51) Int. Cl.
 G02B 27/64 (2006.01)
 H04N 5/225 (2006.01)
 H04N 5/232 (2006.01)

(52) U.S. Cl.
 CPC ......... *G02B 27/646* (2013.01); *H04N 5/2254* (2013.01); *H04N 5/23264* (2013.01);
 (Continued)

(58) Field of Classification Search
 CPC ...... G02B 27/646; G02B 7/023; G02B 7/102; G02B 13/001; G03B 5/00;
 (Continued)

(56) References Cited

U.S. PATENT DOCUMENTS 5,506,732 A * 4/1996 Mori .................... G11B 7/0925
                                                                    359/814
5,920,437 A * 7/1999 Shirotori .................. G11B 7/22
                                                                    359/814
(Continued)

FOREIGN PATENT DOCUMENTS

CN    101762943    6/2010
CN    102282510    12/2011
(Continued)

OTHER PUBLICATIONS

"Office Action of Taiwan Counterpart Application," dated Sep. 20, 2018, with English translation thereof, p. 1-p. 9.
(Continued)

*Primary Examiner* — Christopher Stanford
(74) *Attorney, Agent, or Firm* — JCIPRNET

(57) ABSTRACT

An optical unit with a shake correction function may include a movable body having an optical element, a turnable support mechanism structured to turnably support the movable body around an optical axis of the optical element, a fixed body supporting the movable body through the turnable support mechanism, a magnetic rolling drive mechanism structured to turn the movable body, and an angular position return mechanism structured to return the movable body to a reference angular position around the optical axis. The magnetic rolling drive mechanism may include a coil and a magnet facing the coil. The magnet is polarized and magnetized in a circumferential direction. The angular position return mechanism includes a magnetic member attached to the movable body and, when the movable body is located at the reference angular position, an imaginary plane which includes a magnetizing polarized line of the magnet passes a center of the magnetic member.

16 Claims, 16 Drawing Sheets

(52) U.S. Cl.
CPC . *H04N 5/23287* (2013.01); *G03B 2205/0023* (2013.01); *G03B 2205/0069* (2013.01)

(58) Field of Classification Search
CPC .............. G03B 2205/0069; G03B 5/02; G03B 2205/0015; G03B 2205/0023; G03B 2205/0007; G03B 2205/0053
See application file for complete search history.

(56) References Cited

U.S. PATENT DOCUMENTS

| | | | | |
|---|---|---|---|---|
| 6,288,853 B1* | 9/2001 | Kamada | ............... | G11B 7/0933 359/814 |
| 7,720,366 B2* | 5/2010 | Iwasaki | ............... | G02B 27/646 348/208.99 |
| 8,396,357 B2* | 3/2013 | Yanagisawa | ............. | G02B 7/08 348/208.7 |
| 8,660,416 B2* | 2/2014 | Asakawa | ................. | G03B 5/00 359/554 |
| 9,182,610 B2* | 11/2015 | Nakayama | ............ | G02B 27/646 |
| 9,332,188 B2* | 5/2016 | Takei | ....................... | G03B 5/00 |
| 9,664,921 B2* | 5/2017 | Asakawa | ............. | H02K 41/031 |
| 10,048,508 B2* | 8/2018 | Sue | ....................... | G02B 27/646 |
| 2007/0127904 A1* | 6/2007 | Iwasaki | ................... | G02B 7/10 396/55 |
| 2007/0242938 A1* | 10/2007 | Uno | ..................... | G02B 27/646 396/55 |
| 2008/0008463 A1* | 1/2008 | Otsuka | ..................... | G03B 5/02 396/55 |
| 2008/0170301 A1* | 7/2008 | Maeda | ..................... | G02B 7/00 359/696 |
| 2008/0170851 A1* | 7/2008 | Osoniwa | ................. | G03B 9/02 396/510 |
| 2009/0128928 A1* | 5/2009 | Ito | .......................... | G02B 7/023 359/814 |
| 2010/0086294 A1* | 4/2010 | Lim | ....................... | G02B 7/023 396/144 |
| 2010/0182696 A1* | 7/2010 | Hasegawa | ............ | G02B 27/646 359/557 |
| 2010/0239237 A1* | 9/2010 | Lee | ........................ | G03B 17/00 396/55 |
| 2010/0270870 A1* | 10/2010 | Liao | ........................ | G02B 7/08 310/12.16 |
| 2011/0013030 A1* | 1/2011 | Lee | ........................ | G03B 5/00 348/208.11 |
| 2011/0134528 A1* | 6/2011 | Suzuka | ................ | G02B 27/646 359/554 |
| 2011/0181740 A1* | 7/2011 | Watanabe | ................ | G03B 3/10 348/208.2 |
| 2011/0267692 A1* | 11/2011 | Watanabe | ................ | G03B 5/02 359/557 |
| 2012/0081559 A1* | 4/2012 | Sato | ........................ | G03B 5/00 348/208.11 |
| 2013/0107380 A1* | 5/2013 | Miura | ...................... | G03B 5/02 359/814 |
| 2013/0194683 A1* | 8/2013 | Machida | .................. | G02B 7/04 359/814 |
| 2014/0119717 A1* | 5/2014 | Yasuda | ................ | G02B 27/646 396/55 |
| 2014/0169777 A1* | 6/2014 | Ishimasa | ................ | G02B 27/646 396/55 |
| 2015/0010296 A1* | 1/2015 | Yasuda | ................ | G02B 27/646 396/55 |
| 2015/0124331 A1* | 5/2015 | Fujinaka | ................ | G02B 7/022 359/700 |
| 2015/0160470 A1 | 6/2015 | Terajima | | |
| 2015/0181125 A1* | 6/2015 | Noguchi | ............ | H04N 5/23258 348/208.11 |
| 2015/0195459 A1* | 7/2015 | Yeo | .......................... | G03B 5/00 348/208.2 |
| 2015/0237259 A1* | 8/2015 | Yasuda | ................ | G02B 27/646 348/208.11 |
| 2016/0187669 A1* | 6/2016 | Suzuki | ................ | H04N 5/2254 359/557 |
| 2018/0180899 A1* | 6/2018 | Nagaoka | ............ | G02B 27/646 |

FOREIGN PATENT DOCUMENTS

| | | |
|---|---|---|
| CN | 103226231 | 7/2013 |
| CN | 103901702 | 7/2014 |
| CN | 205982857 | 2/2017 |
| JP | 2007271991 | 10/2007 |
| JP | 2015064501 | 4/2015 |
| TW | 201215911 | 4/2012 |
| WO | 2014207298 | 12/2014 |

OTHER PUBLICATIONS

"Office Action of China Counterpart Application", dated May 21, 2020, with English translation, p. 1-p. 15.

* cited by examiner

OPTICAL UNIT WITH SHAKE CORRECTION FUNCTION

CROSS REFERENCE TO RELATED APPLICATION

The disclosure claims priority under 35 U.S.C. § 119 to Japanese Application No. 2017-092234 filed May 8, 2017, the entire content of which is incorporated herein by reference.

FIELD OF THE DISCLOSURE

At least an embodiment of the disclosure may relate to an optical unit with a shake correction function which is mounted on a portable terminal or a movement body.

BACKGROUND

An optical unit which is mounted on a movement body such as a portable terminal, a vehicle or an unmanned helicopter may include a shake correction function structured to swing or turn a movable body having an optical element to correct a shake in order to restrain disturbance of a photographed image due to the shake of the optical unit. The optical unit with a shake correction function includes, as described in Japanese Patent Laid-Open No. 2015-64501, a swing support mechanism structured to swingably support a movable body having an optical element, a turnable support mechanism structured to turnably support the movable body around an optical axis, a magnetic swing drive mechanism structured to swing the movable body in a pitching (vertical swing, tilting) direction and a yawing (lateral swing, panning) direction intersecting the optical axis, and a magnetic rolling drive mechanism structured to turn the movable body around the optical axis.

Further, the optical unit with a shake correction function described in the Patent Literature includes a plate spring for returning the swung movable body to a predetermined reference posture. The plate spring is provided between an optical module and a support body and is provided with an optical module side fixed part which is fixed to the optical module, a support body side fixed part which is fixed to the support body, and a meandering part meandering between the fixed body side fixed part and the support body side fixed part. The movable body is returned to the reference posture by an elastic return force of the plate spring (meandering part) which is deformed due to a swing.

Patent Literature: Japanese Patent Laid-Open No. 2015-64501

SUMMARY

In a case that the movable body has been turned for restraining disturbance of a photographed image, after that, the movable body is required to be returned to a predetermined reference angular position around the optical axis. Also in this case, it is conceivable that a plate spring is provided between the fixed body and the movable body and the movable body is returned to the reference angular position by an elastic return force of the plate spring which is deformed due to turning of the movable body.

However, in a case that a plate spring is provided between the movable body and the fixed body, it is difficult to widely secure an angle for performing a rolling correction (a turnable angular range of the movable body) while suppressing the size of the device. In other words, in a case that a plate spring is provided between the movable body and the fixed body, a movable region where the plate spring is capable of being displaced and deformed is required to be secured. Therefore, when an angle for performing a rolling correction is increased, a movable region of the plate spring becomes large and thus the size of the device is increased. Further, in a case that a plate spring is used, when the movable body is excessively turned due to an impact or the like, the plate spring may be plastically deformed to occur that the movable body is unable to be returned to the reference angular position.

In view of the problem described above, at least an embodiment of the disclosure may advantageously provide an optical unit with a shake correction function which is capable of returning the movable body to the reference angular position without using a plate spring.

According to at least an embodiment of the disclosure, there may be provided an optical unit with a shake correction function including a movable body having an optical element, a turnable support mechanism structured to turnably support the movable body around an optical axis of the optical element, a fixed body which supports the movable body through the turnable support mechanism, a magnetic rolling drive mechanism structured to turn the movable body, and an angular position return mechanism structured to return the movable body to a reference angular position around the optical axis. The magnetic rolling drive mechanism includes a coil which is fixed to one of the movable body and the fixed body, and a magnet which is fixed to the other of the movable body and the fixed body so as to face the coil. The magnet is polarized and magnetized in a circumferential direction, and the angular position return mechanism includes a magnetic member which is attached to the one of the movable body and the fixed body to which the coil is fixed. When the movable body is disposed at the reference angular position, an imaginary plane which includes a magnetizing polarized line of the magnet and is parallel to the optical axis passes a center of the magnetic member.

In at least an embodiment of the disclosure, the angular position return mechanism structured to return the movable body to a reference angular position includes a magnet and a magnetic member in the magnetic rolling drive mechanism. Further, a center of the magnetic member is overlapped with an imaginary plane including a magnetizing polarized line of the magnet when the movable body is located at the reference angular position. Therefore, when the movable body is turned around the optical axis and a center of the magnetic member is displaced in the circumferential direction from a magnetizing polarized line (imaginary plane) of the magnet, a magnetic attraction force is acted on the magnetic member in a direction where its center is returned to a position overlapped with the magnetizing polarized line. Accordingly, the movable body is returned to the reference angular position by the magnetic attraction force. As a result, the turned movable body can be returned to the reference angular position without providing a plate spring for returning the movable body between the movable body and the fixed body.

In at least an embodiment of the disclosure, the magnetic rolling drive mechanism is structured to turn the movable body in a predetermined angular range with the reference angular position as a center, and at least a part of the magnetic member is overlapped with the imaginary plane when the movable body is turned in the predetermined angular range. According to this structure, a magnetic attraction force in a direction that a center of the magnetic member is returned to a position overlapping with the magnetizing polarized line can be surely generated in the angular range over which the movable body is turned. Therefore, the turned movable body can be surely returned to the reference angular position.

In at least an embodiment of the disclosure, the coil and the magnet are faced each other in the optical axis direction, and the magnetic member is located on an opposite side to the magnet with the coil interposed therebetween in the optical axis direction. When the coil and the magnet face each other in the optical axis direction, a size of the device can be restrained from being increased in the radial direction which is perpendicular to the optical axis. Further, when the magnetic member is disposed on an opposite side to the magnet with the coil interposed therebetween, the magnetic member is capable of functioning as a back yoke for the magnet. Therefore, torque of the magnetic rolling drive mechanism for turning the movable body can be increased. Further, according to this structure, a distance between the magnet and the magnetic member can be secured relatively larger. As a result, linearity of the magnetic attraction force generated between the magnet and the magnetic member can be easily secured with respect to an angle that the movable body is turned.

In at least an embodiment of the disclosure, the magnetic member is disposed at a position separated from the optical axis, and a dimension in the circumferential direction of the magnetic member is longer than a dimension in a radial direction of the magnetic member. According to this structure, when the movable body is turned in a predetermined angular range with the reference angular position as a center, the magnetic member is easily overlapped with the imaginary plane. Further, according to this structure, linearity of the magnetic attraction force generated between the magnet and the magnetic member can be easily secured with respect to an angle that the movable body is turned.

In at least an embodiment of the disclosure, the one of the movable body and the fixed body to which the coil is fixed is provided with a fixed region to which the magnetic member is to be fixed, and a fixed position of the magnetic member is capable of being changed in the fixed region. According to this structure, a reference angular position of the movable body can be determined by changing a fixed position of the magnetic member in the fixed region. Further, a magnitude of a magnetic attraction force generated between the magnet and the magnetic member when the movable body is turned can be changed by changing a fixed position of the magnetic member in the fixed region.

In at least an embodiment of the disclosure, the optical unit includes a turning angle range restriction mechanism structured to restrict a turnable angular range of the movable body for restricting a turnable angular range of the movable body, the turning angle range restriction mechanism includes a protruded part which is protruded from one of the movable body and the fixed body toward the other of the movable body and the fixed body, and an abutting part which is provided in the other of the movable body and the fixed body so as to be capable of abutting with the protruded part in the circumferential direction around the optical axis.

In at least an embodiment of the disclosure, the magnetic rolling drive mechanism includes a first magnetic rolling drive mechanism and a second magnetic rolling drive mechanism which are disposed at different angular positions around the optical axis, and the magnetic member includes a first magnetic member which is attached to the one of the movable body and the fixed body to which the coil of the first magnetic rolling drive mechanism is fixed, and a second magnetic member which is attached to the one of the movable body and the fixed body to which the coil of the second magnetic rolling drive mechanism is fixed. According to this structure, the movable body can be returned to the reference angular position by a magnetic attraction force between the first magnetic member and a magnet of the first magnetic rolling drive mechanism and a magnetic attraction force between the second magnetic member and a magnet of the second magnetic rolling drive mechanism.

In at least an embodiment of the disclosure, the movable body includes an optical module having the optical element, a swing support mechanism structured to swingably support the optical module, a support body which supports the optical module through the swing support mechanism, and a magnetic swing drive mechanism structured to swing the optical module. The turnable support mechanism turnably supports the support body, and the fixed body supports the movable body through the turnable support mechanism and the support body. According to this structure, the movable body can be turned and swung. Specifically, it may be structured that the swing support mechanism swingably supports the optical module between a reference posture in which an axial line previously set and an optical axis of the optical element are coincided with each other and a tilted posture in which the optical axis is tilted with respect to the axial line, and the magnetic swing drive mechanism, which is structured between the optical module and the fixed body, includes a first magnetic swing drive mechanism structured to turn the optical module around a "Y"-axis perpendicular to the axial line, and a second magnetic swing drive mechanism structured to turn the optical module around an "X"-axis perpendicular to the axial line and the "Y"-axis. In addition, the turnable support mechanism includes a turnable pedestal having a pedestal main body to which the support body is attached and a shaft part protruded from the pedestal main body in a direction of the axial line, and a bearing mechanism which turnably holds the turnable pedestal with respect to the fixed body through the shaft part.

In at least an embodiment of the present invention, the fixed body is provided with a tube part which holds the bearing mechanism turnably holding the shaft part protruded from the pedestal main body, and a fixing member which is provided so as to face the pedestal main body, a face of the pedestal main body which faces the fixing member holds a rolling drive coil which is the coil, and the fixing member is fixed with a rolling drive magnet which is the magnet so as to face the rolling drive coil. According to this structure, the magnetic rolling drive mechanism can be structured between the pedestal main body and the fixing member facing each other and thus a structure of the magnetic rolling drive mechanism can be made thinner in the axial line direction. In this case, it may be structured that the pedestal main body includes an angular position return magnetic member on an opposite side to the rolling drive magnet with the rolling drive coil interposed therebetween in the direction of the axial line at a position where the angular position return magnetic member is overlapped with the rolling drive magnet when viewed in the direction of the axial line.

In at least an embodiment of the present invention, the rolling drive coil and the rolling drive magnet are respectively provided at two positions with the tube part interposed therebetween, and the angular position return magnetic member is provided at positions overlapped with the respective rolling drive magnets. According to this structure, the turnable pedestal can be returned to the reference angular position by magnetic attraction forces between the angular position return magnetic members and the rolling drive magnets of the magnetic rolling drive mechanisms provided at two positions with the tube part interposed therebetween.

In at least an embodiment of the present invention, the pedestal main body is provided with a fixed region to which the angular position return magnetic member is to be fixed, a fixed position of the angular position return magnetic member is capable of being changed in the fixed region and, when a state that the movable body is located at the reference angular position is viewed in the direction of the axial line, a position of the angular position return magnetic member is adjusted so that a center of the angular position return magnetic member is coincided with a magnetizing polarized line of the rolling drive magnet and the angular position return magnetic member is fixed.

In at least an embodiment of the present invention, the optical unit includes a turning angle range restriction mechanism structured to restrict a turnable angular range of the turnable pedestal, and the turning angle range restriction mechanism is structured so that a turning stopper protruded part is inserted into an opening part between the fixing member and the turnable pedestal. According to this structure, the turning angle range restriction mechanism can be provided in a simple structure having a turning stopper protruded part and an opening part.

In at least an embodiment of the present invention, the optical unit includes a turning angle range restriction mechanism structured to restrict a turnable angular range of the turnable pedestal, and a dimension in the circumferential direction of the angular position return magnetic member is set so that the angular position return magnetic member always faces the magnetizing polarized line of the rolling drive magnet when the turnable pedestal is turned in the turnable angular range. According to this structure, a magnetic attraction force in a direction that a center of the angular position return magnetic member is returned to a position overlapping with the magnetizing polarized line can be generated surely in an angular range in which the turnable pedestal is turned.

Other features and advantages of the invention will be apparent from the following detailed description, taken in conjunction with the accompanying drawings that illustrate, by way of example, various features of embodiments of the invention.

According to the optical unit with a shake correction function of the disclosure, the turned movable body can be returned to the reference angular position without providing a plate spring between the movable body and the fixed body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of an optical unit to which the disclosure is applied will be described below with reference to the accompanying drawings. In this specification, three axes "X", "Y" and "Z" are directions perpendicular to each other. One side in the "X"-axis direction is indicated as "+X", the other side is indicated as "−X", one side in the "Y"-axis direction is indicated as "+Y", the other side is indicated as "−Y", one side in the "Z"-axis direction is indicated as "+Z", and the other side is indicated as "−Z". The "Z"-axis direction is an axial line direction of an optical unit and is an optical axis direction of an optical element. The "+Z" direction is an object side of the optical unit and the "−Z" direction is an anti-object side (image side) of the optical unit.

(Entire Structure)

Figure 1:
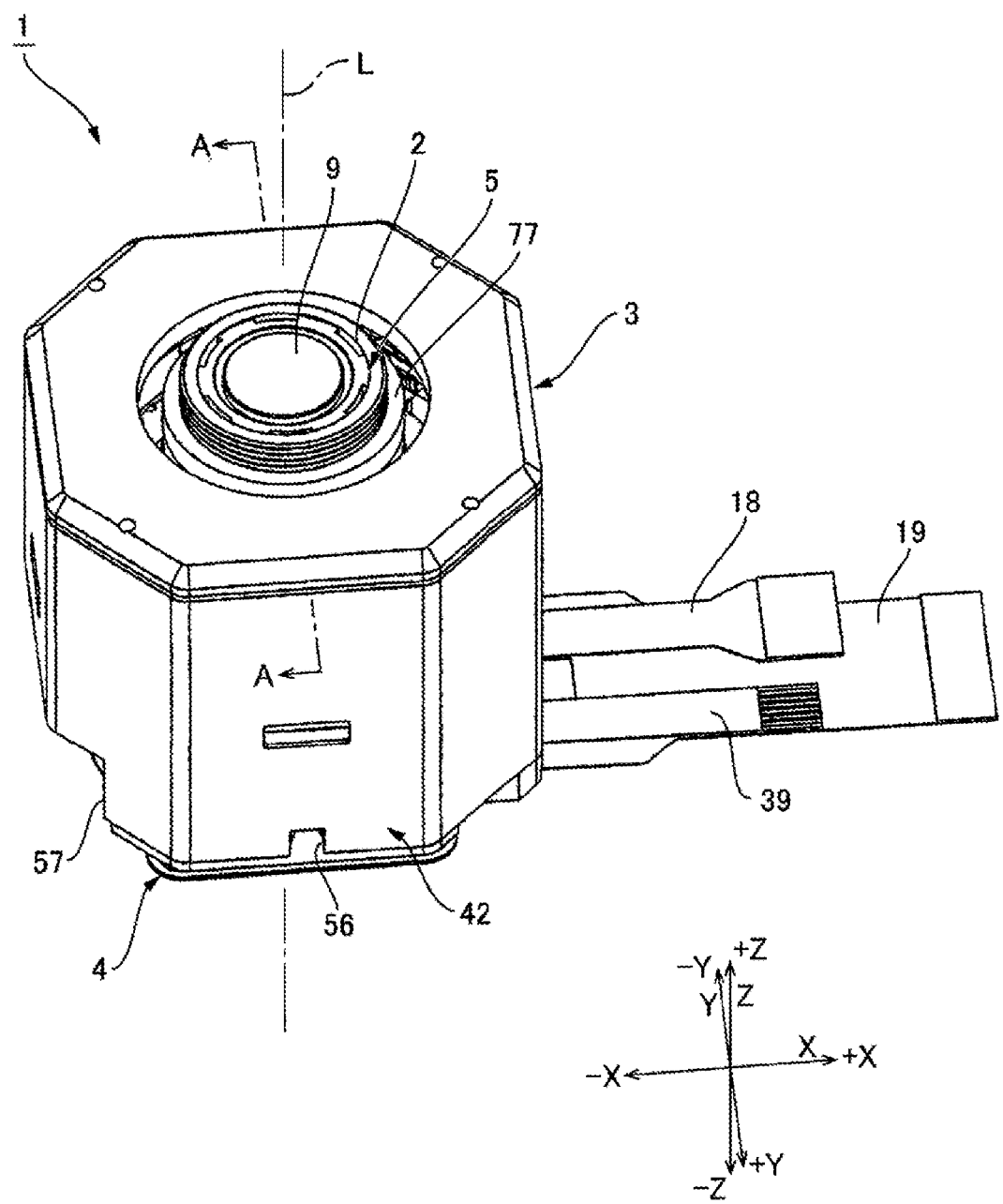
FIG. 1 is a perspective view showing an optical unit in accordance with an embodiment of the disclosure which is viewed from an object side.
Figure 2:
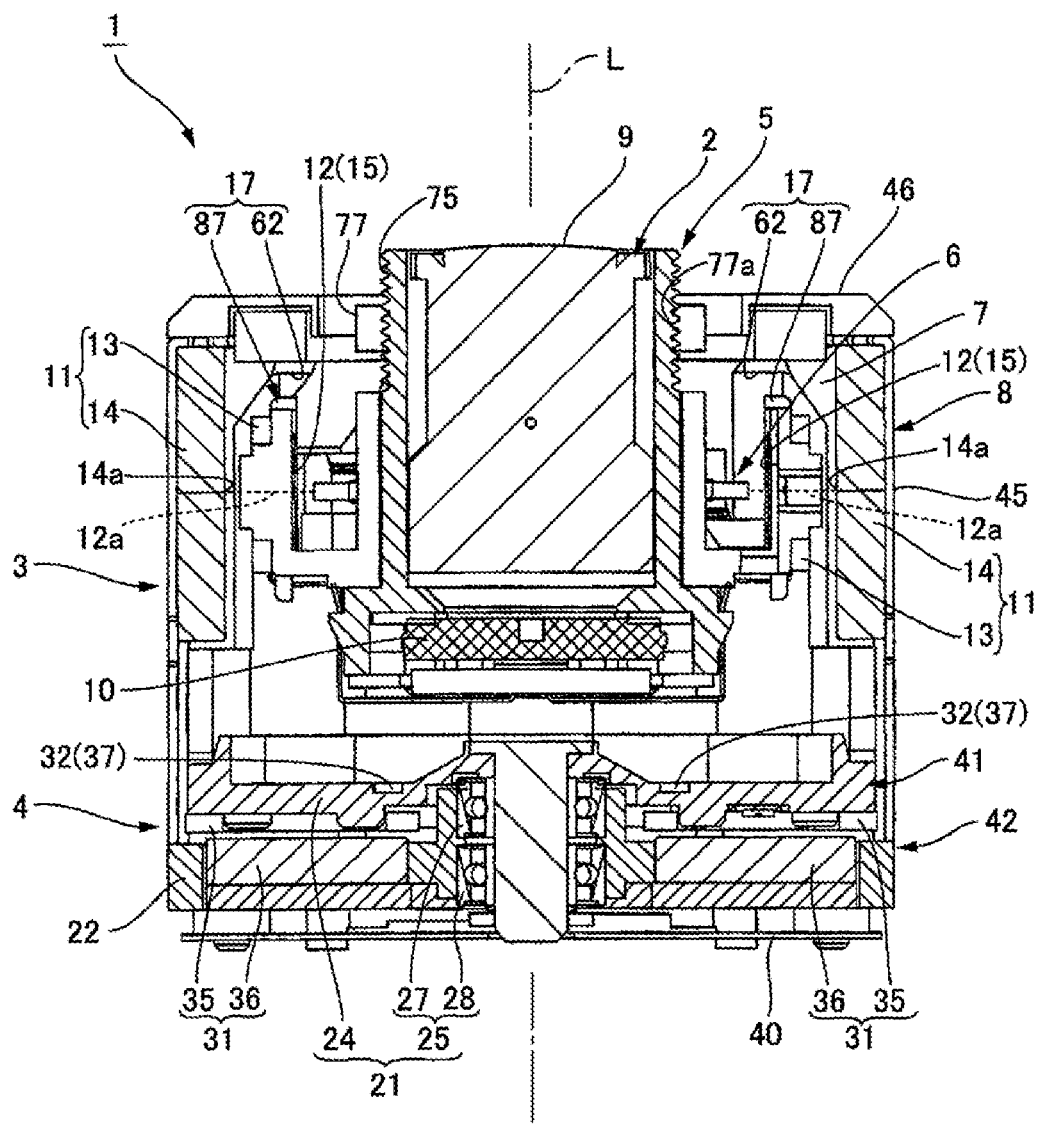
FIG. 2 is a cross-sectional view showing the optical unit which is cut by the "A-A" line in FIG. 1.
Figure 3:
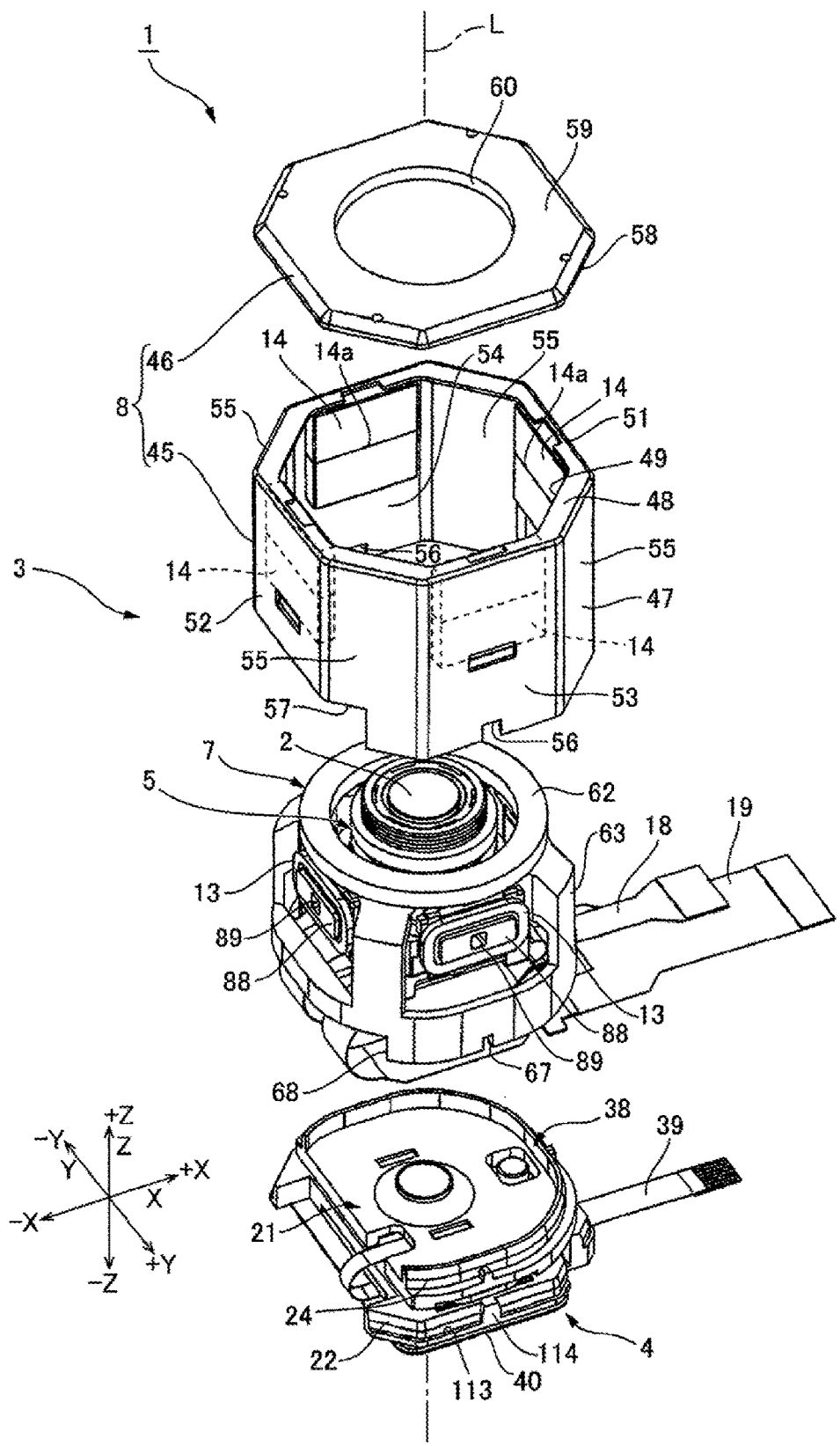
FIG. 3 is an exploded perspective view showing the optical unit in FIG. 1 which is viewed from an object side.

FIG. 1 is a perspective view showing an optical unit in accordance with an embodiment of the disclosure which is viewed from an object side. FIG. 2 is a cross-sectional view showing the optical unit which is cut by the "A-A" line in FIG. 1. FIG. 3 is an exploded perspective view showing the optical unit in FIG. 1 which is viewed from an object side. An optical unit 1 shown in FIG. 1 is, for example, used in an optical device such as a cell phone with a camera and a drive recorder or in an optical device such as an action camera mounted on a helmet, a bicycle, a radio-controlled helicopter and the like or a wearable camera. In the optical device, when a shake is occurred in the optical device at the time of photographing, disturbance of a photographed image is generated. The optical unit 1 in this embodiment is an optical unit with a shake correction function structured to correct a tilt and a turning of an optical module 2 which is mounted on the optical unit in order to avoid disturbance of a photographed image.

As shown in FIGS. 2 and 3, the optical unit 1 includes a first unit 3 having the optical module 2 and a second unit 4 which turnably supports the first unit 3 from the "−Z" direction side.

As shown in FIG. 2, the first unit 3 includes a movable unit 5 having the optical module 2, a swing support mechanism 6 which swingably supports the movable unit 5, a holder 7 (support body) which supports the movable unit 5 through the swing support mechanism 6, and a case body 8 which surrounds the movable unit 5 and the holder 7 from an outer peripheral side. The optical module 2 includes an optical element 9 and an imaging element 10 disposed on an optical axis of the optical element 9. The swing support mechanism 6 swingably supports the movable unit 5 between a reference posture where an axial line "L" previously set and the optical axis of the optical element 9 are coincided with each other and an inclined posture where the optical axis is tilted with respect to the axial line "L". The swing support mechanism 6 is a gimbal mechanism. In this embodiment, the axial line "L" is coincided with the "Z"-axis.

The first unit 3 includes a magnetic swing drive mechanism 11 structured to swing the movable unit 5 and a posture return mechanism 12 structured to return the swung movable unit 5 to the reference posture. The magnetic swing drive mechanism 11 includes swing drive coils 13 which are held by the movable unit 5 and swing drive magnets 14 which are held by the case body 8. The swing drive coil 13 and the swing drive magnet 14 are faced each other in a radial direction perpendicular to the axial line "L". The posture return mechanism 12 includes posture return magnetic members 15 which are held by the movable unit 5 and face the swing drive magnets 14.

In addition, the first unit 3 includes a swing stopper mechanism 17 structured to restrict a swing range of the movable unit 5. Further, the first unit 3 includes a flexible printed circuit board 18 which is electrically connected with the swing drive coils 13 and a flexible printed circuit board 19 which is electrically connected with the imaging element 10.

The second unit 4 includes a turnable support mechanism 21, which turnably supports the holder 7 around the axial line "L", and a fixing member 22 which supports the holder 7 through the turnable support mechanism 21. The turnable support mechanism 21 includes a turnable pedestal 24 and a bearing mechanism 25. The turnable pedestal 24 is turnably supported by the fixing member 22 through the bearing mechanism 25. The bearing mechanism 25 includes a first ball bearing 27 and a second ball bearing 28 which are arranged in the "Z"-axis direction. The first ball bearing 27 is located on the "+Z" direction side with respect to the second ball bearing 28.

The second unit 4 includes a magnetic rolling drive mechanism 31 structured to turn the turnable pedestal 24 and an angular position return mechanism 32 structured to return the turnable pedestal 24 being turned to a predetermined reference angular position. The magnetic rolling drive mechanism 31 includes rolling drive coils 35 held by the turnable pedestal 24 and rolling drive magnets 36 held by the fixing member 22. The rolling drive coil 35 and the rolling drive magnet 36 are faced each other in the "Z"-axis direction. The angular position return mechanism 32 includes angular position return magnetic members 37 which are fixed to the turnable pedestal 24. The angular position return magnetic member 37 is overlapped with the rolling drive magnet 36 when viewed in the "Z"-axis direction. In addition, the second unit 4 includes a turning stopper mechanism 38 (turning angle range restriction mechanism) structured to restrict a turnable angular range of the turnable pedestal 24. Further, the second unit 4 includes a flexible printed circuit board 39 which is electrically connected with the rolling drive coils 35 and a cover member 40 which is fixed to the fixing member 22.

In this embodiment, the holder 7 of the first unit 3 is attached to the turnable pedestal 24. Therefore, when the turnable pedestal 24 is turned, the movable unit 5 and the holder 7 of the first unit 3 are turned around the "Z"-axis (around the axial line "L") together with the turnable pedestal 24. Accordingly, the movable unit 5 and the holder 7 of the first unit 3 and the turnable pedestal 24 of the second unit 4 structure the movable body 41 which is integrally turned around the "Z"-axis. On the other hand, the case body 8 of the first unit 3 is attached to the fixing member 22. Therefore, the fixing member 22 and the case body 8 structure a fixed body 42 which turnably supports the movable body 41. The turnable pedestal 24 structures the turnable support mechanism 21 and structures the movable body 41.

(First Unit)

As shown in FIG. 3, the case body 8 includes a tube-shaped case 45 formed in a substantially octagonal outward shape when viewed in the "Z"-axis direction, and an object side case 46 which is assembled to the tube-shaped case 45 from the "+Z" direction side (object side). The tube-shaped case 45 is formed of magnetic material. The object side case 46 is formed of resin material.

The tube-shaped case 45 is provided with a body part 47 in a substantially octagonal tube shape and an end plate part 48 in a frame shape which is projected to an inner side from an end part in the "+Z" direction of the body part 47. An opening part 49 in a substantially octagonal shape is formed at a center of the end plate part 48. The body part 47 is provided with side plates 51 and 52 facing each other in the "X"-axis direction, side plates 53 and 54 facing each other in the "Y"-axis direction, and side plates 55 which are provided at four corner parts so as to be inclined by 45 degrees with respect to the "X"-axis direction and the "Y"-axis direction. The swing drive magnet 14 is fixed to each of inner peripheral faces of the side plates 51 and 52 facing in the "X"-axis direction and the side plates 53 and 54 facing in the "Y"-axis direction. Each of the swing drive magnets 14 is polarized and magnetized in the "Z"-axis direction. A magnetizing polarized line 14a of each of the swing drive magnets 14 is extended in a circumferential direction which is a direction perpendicular to the "Z"-axis (axial line "L").

The tube-shaped case 45 is provided with a positioning cut-out part 56 in each of a lower end edge portion in the "+X" direction, a lower end edge portion in the "+Y" direction, and a lower end edge portion in the "−Y" direction. Further, the body part 47 is provided with a rectangular cut-out part 57 for extending the flexible printed circuit boards 18 and 19 in a lower end edge portion in the "−X" direction.

The object side case 46 is provided with a body part 58 in a tube shape which is abutted with the end plate part 48 of the tube-shaped case 45 and an end plate part 59 which is projected to an inner side from an end part in the "+Z" direction of the body part 58. A circular opening part 60 is formed at a center of the end plate part 59. An end portion in the "+Z" direction of the optical module 2 is inserted into the circular opening part 60.

(Holder)

Figure 4:
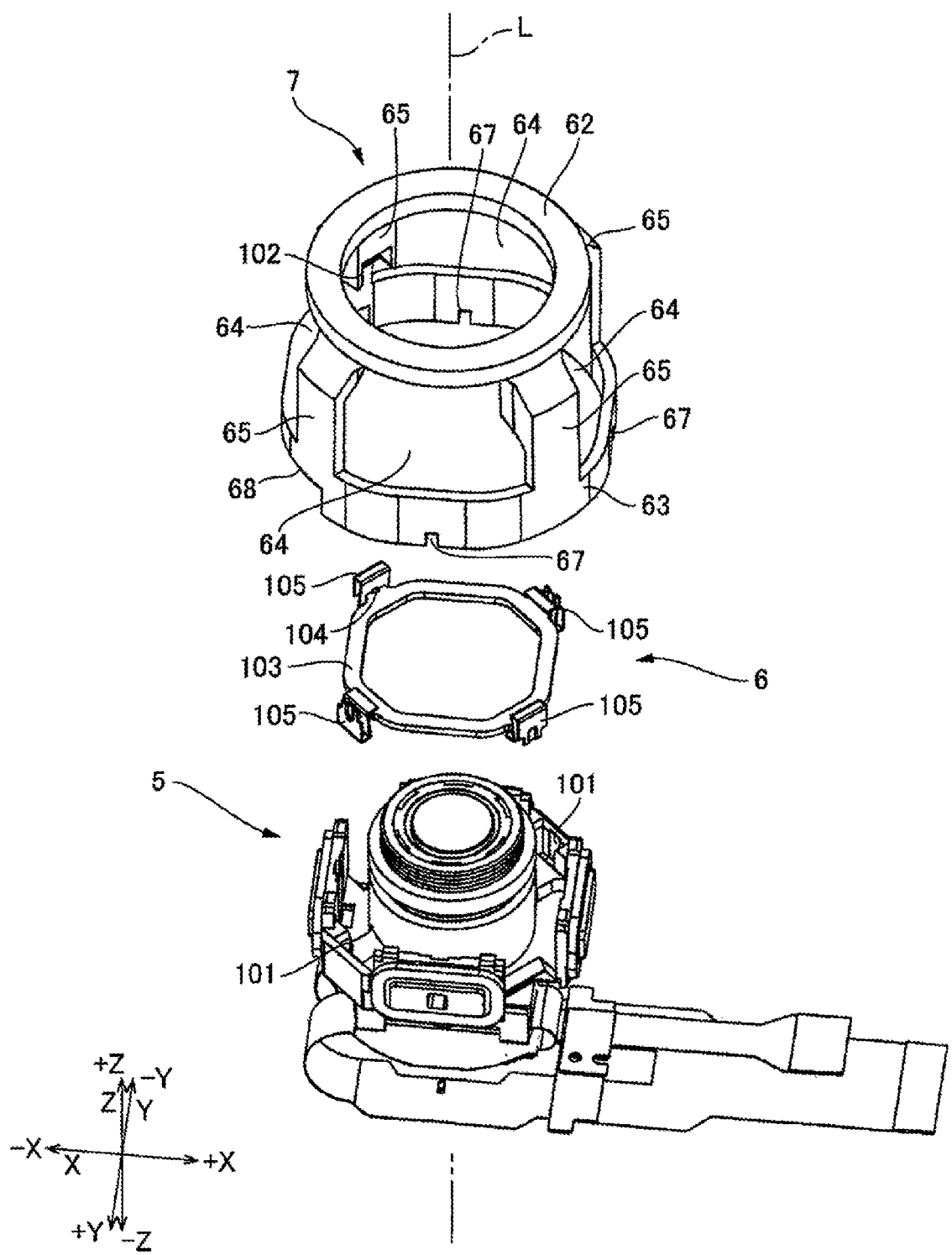
FIG. 4 is an exploded perspective view showing a first unit which is viewed from an object side.
Figure 5:
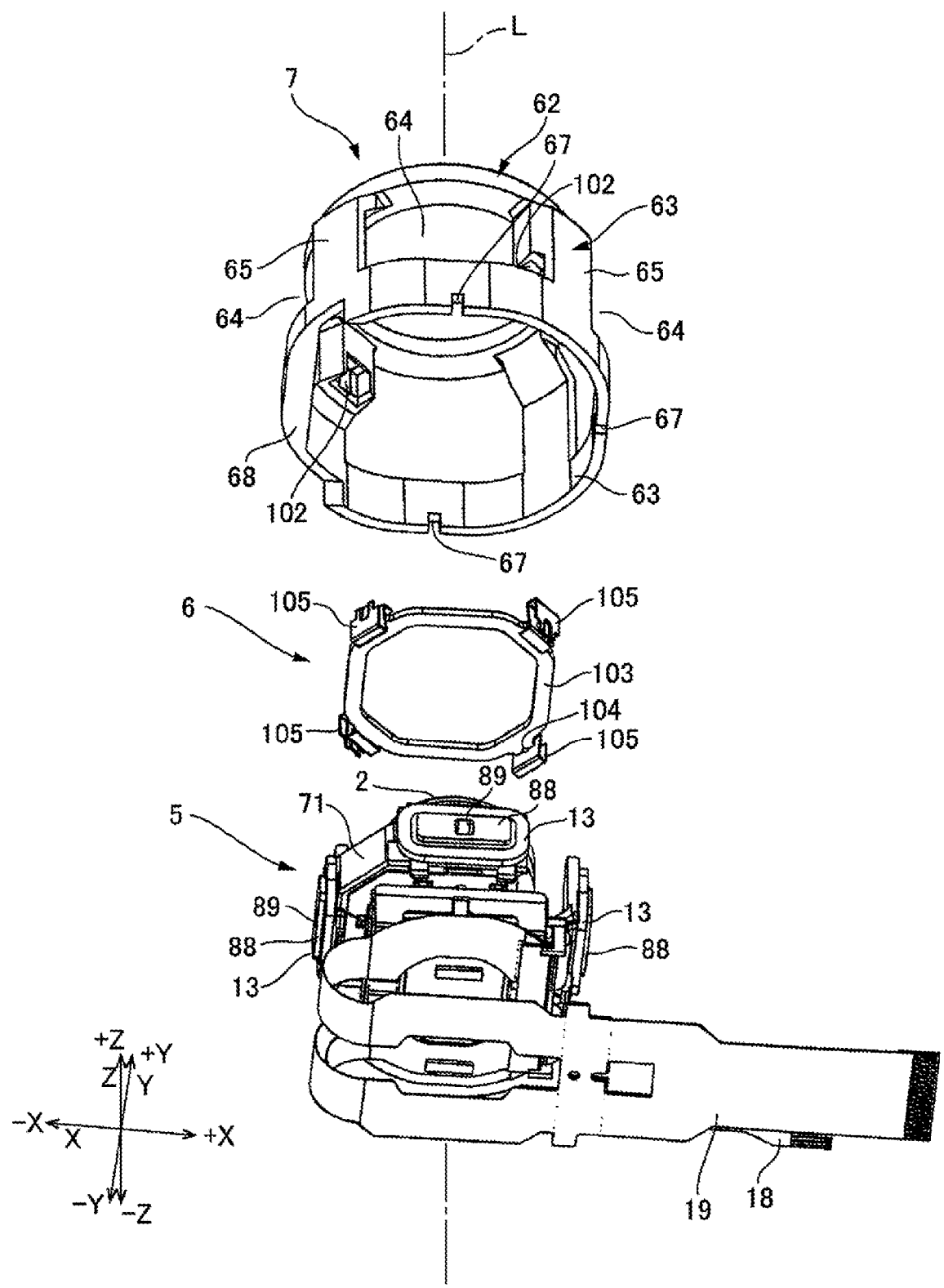
FIG. 5 is an exploded perspective view showing the first unit which is viewed from an anti-object side.

FIG. 4 is an exploded perspective view showing the movable unit 5 and the holder 7 which are viewed from the "+Z" direction side. FIG. 5 is an exploded perspective view showing the movable unit 5 and the holder 7 which are viewed from the "−Z" direction side. As shown in FIG. 4, the holder 7 is provided with a holder ring-shaped part 62 into which an end portion in the "+Z" direction of the movable unit 5 is inserted, and a holder body part 63 which is continuously formed on the "−Z" direction side from the holder ring-shaped part 62. The holder body part 63 is provided with four window parts 64 arranged in the circumferential direction and four vertical frame parts 65 which section the window parts 64 adjacent to each other in the circumferential direction. Two of the four window parts 64 are opened in the "X"-axis direction, and the other two are opened in the "Y"-axis direction. Four vertical frame parts 65 are respectively disposed at angular positions between the "X"-axis direction and the "Y"-axis direction.

The holder body part 63 is provided with a positioning cut-out part 67 in each of a lower end edge portion in the "+X" direction, a lower end edge portion in the "+Y" direction, and a lower end edge portion in the "−Y" direction. Further, the holder body part 63 is provided with a rectangular cut-out part 68 for extending the flexible printed circuit boards 18 and 19 in a lower end edge portion in the "−X" direction.

(Movable Unit)

Figure 6:
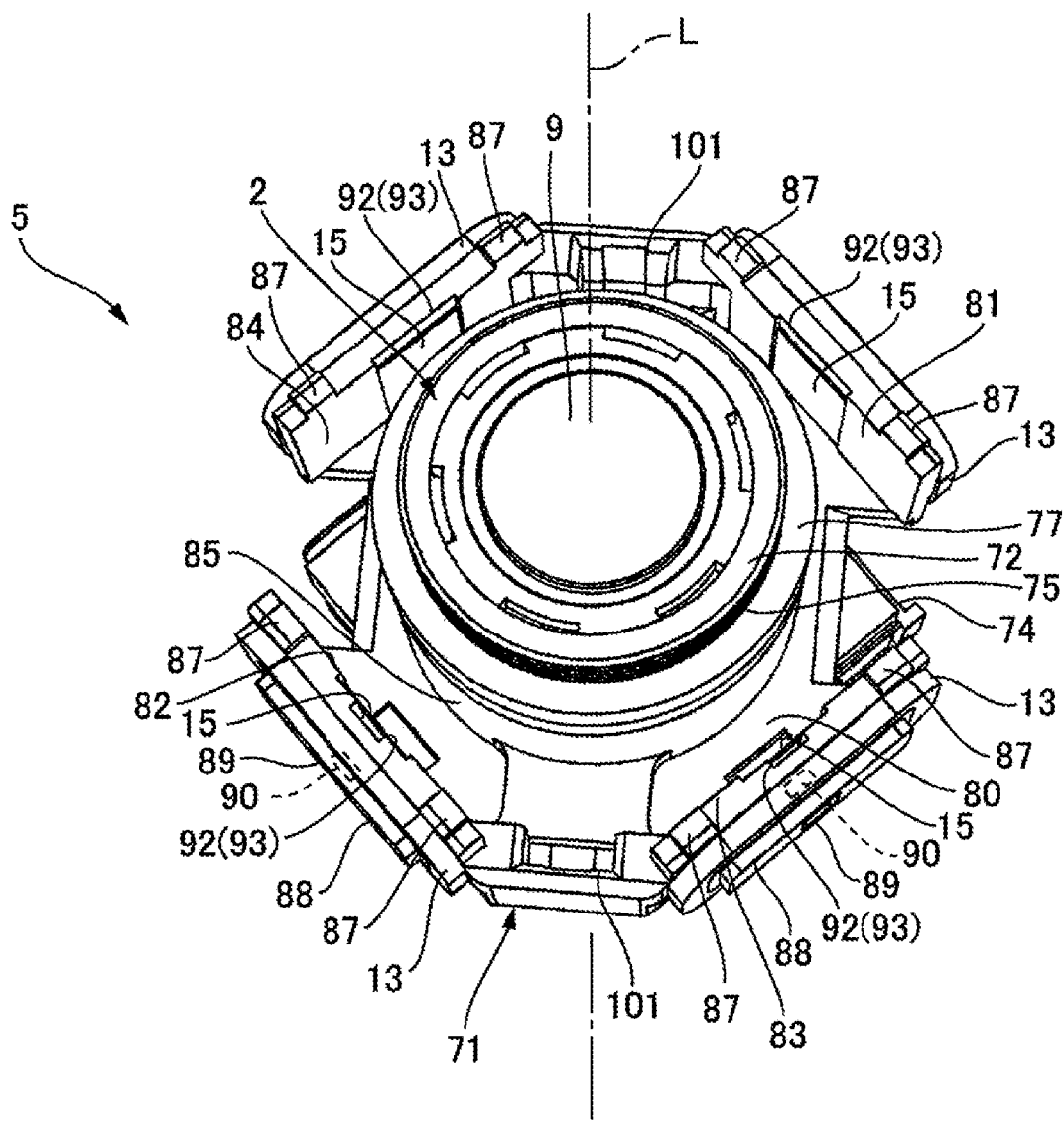
FIG. 6 is a perspective view showing a movable body which is viewed from an object side.
Figure 6:
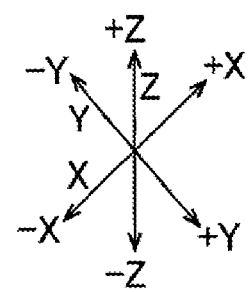
Figure 7A:
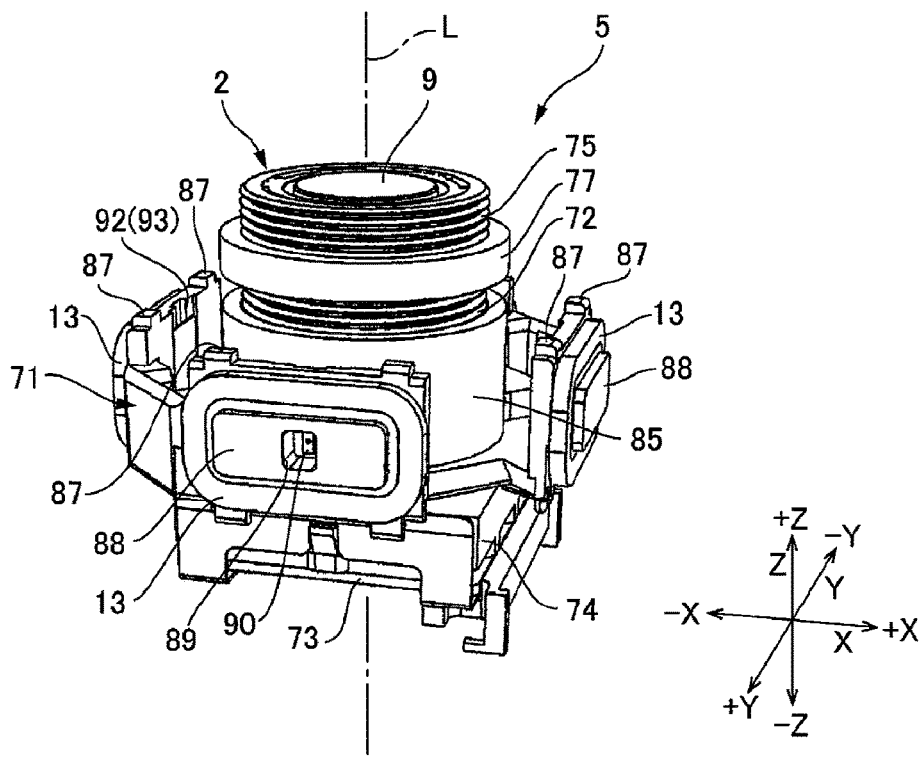
FIGS. 7A and 7B are perspective views showing the movable body which are viewed from an object side and an anti-object side.
Figure 7B:
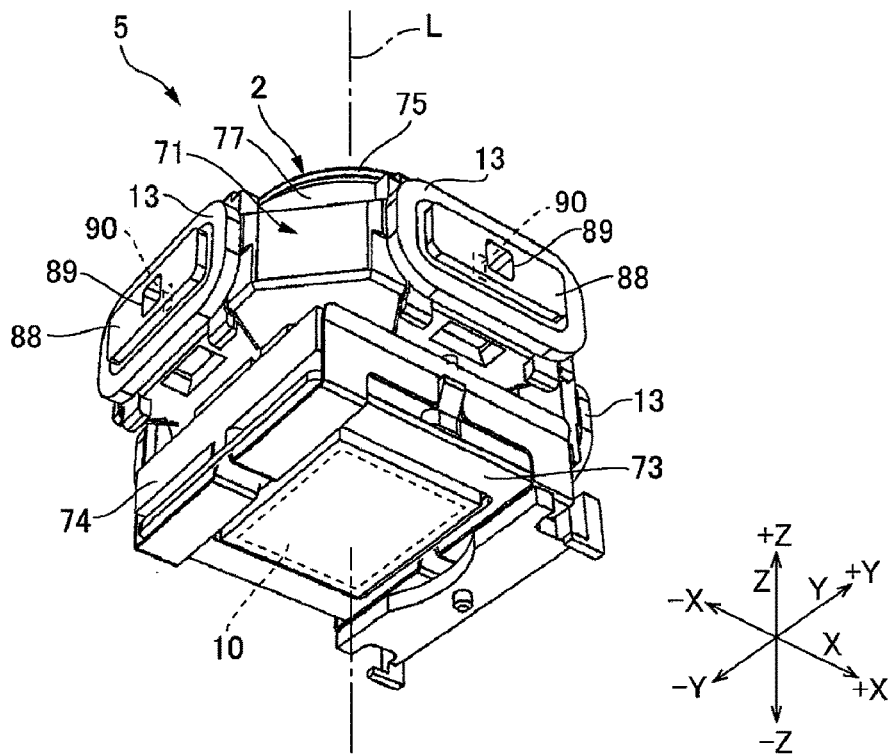

FIG. 6 is a perspective view showing the movable unit 5 which is viewed from the "+Z" direction side (object side). FIG. 7A is a perspective view showing the movable unit 5 which is viewed from the "+Z" direction side (object side) and FIG. 7B is a perspective view showing the movable unit 5 which is viewed from the "−Z" direction side. As shown in FIG. 6 and FIGS. 7A and 7B, the movable unit 5 includes the optical module 2 and an optical module holder 71 which holds the optical module 2 from an outer peripheral side. The optical module 2 includes a lens barrel part 72 which holds the optical element 9 on an inner peripheral side, and a rectangular tube part 74 which holds a circuit board 73 on an inner peripheral side in an end portion in the "−Z" direction of the lens barrel part 72. The imaging element 10 is mounted on the circuit board 73. A male screw part 75 is provided on an outer peripheral face of an end part in the "+Z" direction of the lens barrel part 72 in a region over a predetermined width in the "Z"-axis direction.

A weight 77 for adjusting a gravity center position of the movable unit 5 is attached to the male screw part 75. The weight 77 is formed in a ring shape and is provided with a female screw part 77a which is capable of being threadedly engaged with the male screw part 75 on its inner peripheral face (see FIG. 2). In this embodiment, the male screw part 75 is a fixed region to which the weight 77 is to be fixed. When the weight 77 is turned around the "Z"-axis, a position of the weight 77 is moved in the "Z"-axis direction in the fixed region and thus a gravity center position of the movable unit 5 can be adjusted in the "Z"-axis direction.

As shown in FIG. 6, the optical module holder 71 is provided with a bottom plate part 80 in a substantially octagonal shape when viewed in the "Z"-axis direction, a pair of wall parts 81 and 82 which are stood up to the "+Z" direction and extended in the "Y"-axis direction at both ends in the "X"-axis direction of the bottom plate part 80, and a pair of wall parts 83 and 84 which are stood up to the "+Z" direction and extended in the "X"-axis direction at both ends in the "Y"-axis direction of the bottom plate part 80. Further, the optical module holder 71 is provided with an optical module holding part 85 which is provided at a center of the bottom plate part 80. The optical module holding part 85 is formed in a tube shape and is coaxial with the axial line "L". The lens barrel part 72 of the optical module 2 is inserted into the optical module holding part 85. The optical module holding part 85 holds the lens barrel part 72 from an outer peripheral side. An end face in the "+Z" direction of each of the wall parts 81, 82, 83 and 84 is provided with two swing stopper protruded parts 87 which are protruded to the "+Z" direction. The two swing stopper protruded parts 87 are respectively protruded from both end portions in the circumferential direction of each of the wall parts 81, 82, 83 and 84.

A coil fixed part 88 is provided on an outer side face facing an outer side in the radial direction of each of the wall parts 81, 82, 83 and 84. A swing drive coil 13 is fixed to each of the coil fixed parts 88 in a posture that its center hole is directed to an outer side in the radial direction. Further, a Hall element fixed part 89 is provided in the coil fixed parts 88 of the wall part 82 located on the "−X" direction side and the wall part 83 located on the "+Y" direction side. Hall elements 90 are fixed to the Hall element fixed parts 89. The Hall element 90 is located at a center of each of the swing drive coils 13 in the "Z"-axis direction. The Hall element 90 is electrically connected with the flexible printed circuit board 18.

An inner side face facing an inner side in the radial direction of each of the wall parts 81, 82, 83 and 84 is provided with a fixed region 92 for fixing a posture return magnetic member 15. The fixed region 92 is a groove 93 which is extended in the "Z"-axis direction on an inner side face with a constant width. The posture return magnetic member 15 is formed in a rectangular plate shape and its dimension in the "Z"-axis direction is longer than its dimension in the circumferential direction. Further, the dimension in the "Z"-axis direction of the posture return magnetic member 15 is shorter than a dimension in the "Z"-axis direction of the groove 93. The posture return magnetic member 15 is fixed in the groove 93 (in the fixed region 92) in a posture that its longitudinal direction is directed in the "Z"-axis direction. In this embodiment, the posture return magnetic member 15 is fixed to an inside of the groove 93 (in the fixed region 92) with an adhesive after its fixed position in the groove 93 (in the fixed region 92) is adjusted in the "Z" direction so that the center of the posture return magnetic member 15 is overlapped with the magnetizing polarized line 14a of the swing drive magnet 14 when the movable unit 5 set in the reference posture state is viewed in the radial direction.

(Swing Support Mechanism)

Figure 8:
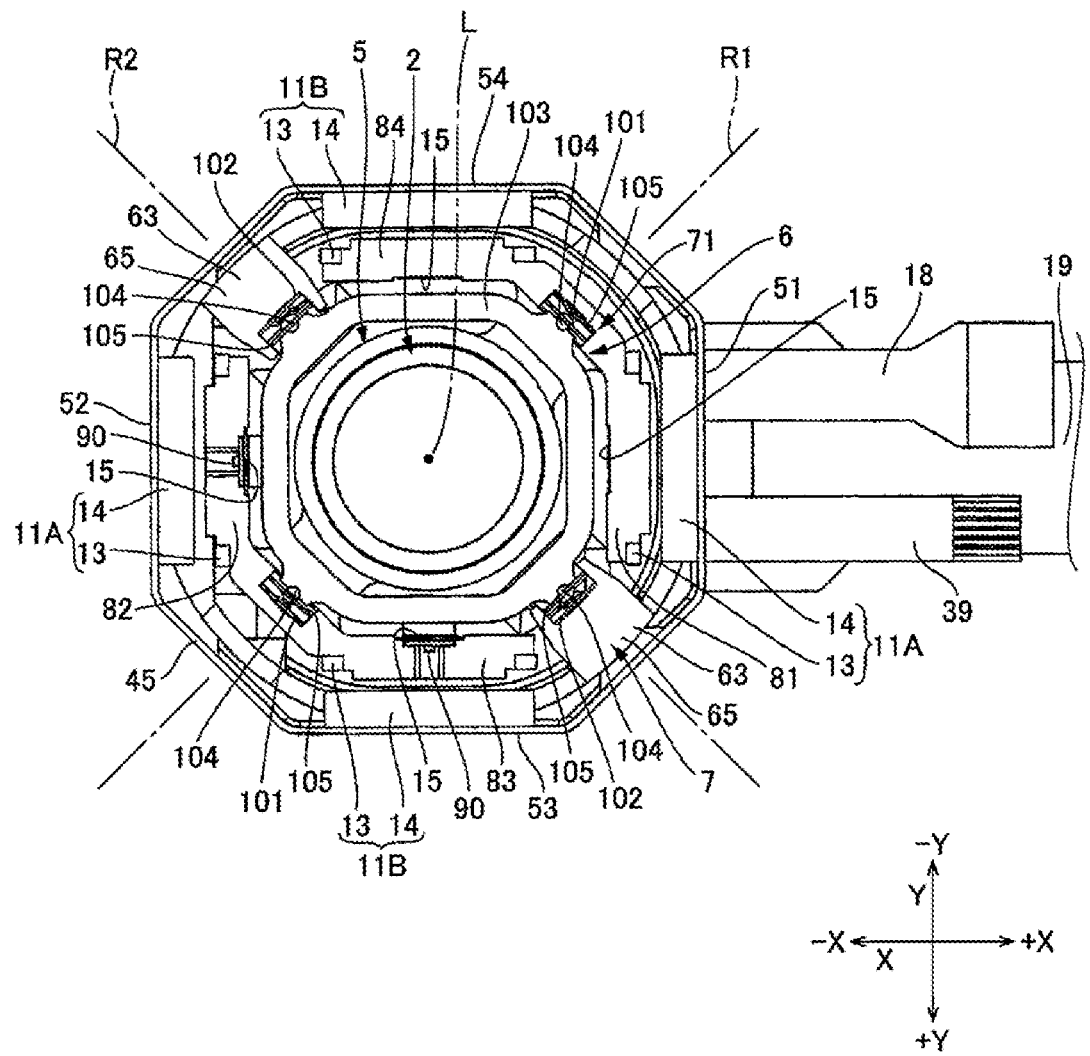
FIG. 8 is a cross-sectional view showing the optical unit which is cut by a plane perpendicular to an axial line.

FIG. 8 is a cross-sectional view showing the optical unit 1 which is cut by a plane perpendicular to the "Z"-axis (axial line "L") and passing the swing support mechanism 6. The swing support mechanism 6 is structured between the optical module holder 71 and the holder 7. As shown in FIG. 8, the swing support mechanism 6 includes two first swing support parts 101 provided at diagonal positions on a first axis "R1" of the optical module holder 71, two second swing support parts 102 provided at diagonal positions on a second axis "R2" of the holder body part 63, and a movable frame 103 which is supported by the first swing support parts 101 and the second swing support parts 102. In this embodiment, the first axis "R1" and the second axis "R2" are perpendicular to the "Z"-axis direction and are, in addition, inclined by 45 degrees with respect to the "X"-axis direction and the "Y"-axis direction. Therefore, the first swing support parts 101 and the second swing support parts 102 are disposed at angular positions between the "X"-axis direction and the "Y"-axis direction. As shown in FIGS. 4 and 5, the second swing support part 102 is a recessed part which is formed on an inner side face of the holder body part 63.

As shown in FIG. 8, the movable frame 103 is a plate-shaped spring whose planar shape viewed in the "Z"-axis direction is a substantially octagonal shape. Metal spherical bodies 104 are fixed to outer side faces of the movable frame 103 at four positions around the "Z"-axis by welding or the like. The spherical bodies 104 are in point contact with contact springs 105 which are held by the first swing support parts 101 provided in the optical module holder 71, and are in point contact with contact springs 105 which are held by the second swing support parts 102 provided in the holder body part 63. As shown in FIGS. 4 and 5, the contact spring 105 is a plate-shaped spring. The contact spring 105 held by the first swing support part 101 is capable of being elastically deformed in the first axis "R1" direction, and the contact spring 105 held by the second swing support part 102 is capable of being elastically deformed in the second axis "R2" direction. Therefore, the movable frame 103 is supported in a turnable state around two directions perpendicular to the "Z"-axis direction (the first axis "R1" direction and the second axis "R2" direction).

(Magnetic Swing Drive Mechanism)

The magnetic swing drive mechanism 11 includes, as shown in FIG. 8, a first magnetic swing drive mechanism 11A and a second magnetic swing drive mechanism 11B which are provided between the movable unit 5 and the tube-shaped case 45. The first magnetic swing drive mechanism 11A includes two pairs of the swing drive magnets 14 and the swing drive coils 13 facing each other in the "X"-axis direction. Further, the first magnetic swing drive mechanism 11A includes the Hall element 90 which is disposed on an inner side of the swing drive coil 13 in the pair on the "−X" direction side. The second magnetic swing drive mechanism 11B includes two pairs of the swing drive magnets 14 and the swing drive coils 13 facing each other in the "Y"-axis direction. Further, the second magnetic swing drive mechanism 11B includes the Hall element 90 which is disposed on an inner side of the swing drive coil 13 in the pair on the "+Y" direction side.

The respective swing drive coils 13 are held by outer side faces of the wall parts 81 and 82 on both sides in the "X"-axis direction of the optical module holder 71 and the wall parts 83 and 84 on both sides in the "Y"-axis direction. The swing drive magnet 14 is held by an inner side face of each of the side plates 51, 52, 53 and 54 provided in the tube-shaped case 45. Each of the swing drive magnets 14 is divided into two pieces in the "Z"-axis direction as shown in FIGS. 2 and 3 and magnetic poles on the inner face side are magnetized so as to be different from each other with the magnetizing polarized line 14a as a boundary. Long side portions on the "+Z" direction side and the "−Z" direction side of the swing drive coil 13 are utilized as effective sides. When the movable unit 5 is set in the reference posture, each of the Hall elements 90 faces the magnetizing polarized line 14a of the swing drive magnet 14 disposed on the outer peripheral side. In this embodiment, the tube-shaped case 45 is structured of magnetic material and thus the tube-shaped case 45 functions as a yoke for the swing drive magnets 14.

Two pairs of the second magnetic swing drive mechanisms 11B which are located on the "+Y" direction side and the "−Y" direction side of the movable unit 5 are electrically connected so that magnetic-drive forces are generated in the same direction around the "X"-axis at the time of energization to the swing drive coils 13. Further, two pairs of the first magnetic swing drive mechanisms 11A which are located on the "+X" direction side and the "−X" direction side of the movable unit 5 are electrically connected so that magnetic-drive forces are generated in the same direction around the "Y"-axis at the time of energization to the swing drive coils 13. The magnetic swing drive mechanism 11 turns the optical module 2 around the first axis "R1" and the second axis "R2" by combining turning around the "X"-axis by the second magnetic swing drive mechanisms 11B and turning around the "Y"-axis by the first magnetic swing drive mechanisms 11A. When a shake correction around the "X"-axis and a shake correction around the "Y"-axis are to be performed, turning around the first axis "R1" and turning around the second axis "R2" are combined.

(Swing Stopper Mechanism)

As shown in FIG. 2, the swing stopper mechanism 17 structured to restrict a swing range of the movable unit 5 is structured of the swing stopper protruded parts 87 provided in the movable unit 5 (optical module holder 71) and the holder ring-shaped part 62. When the movable unit 5 is going to be in a tilted posture by exceeding a predetermined swing range, the swing stopper protruded part 87 is abutted with the holder ring-shaped part 62 to prevent the movable unit 5 from being further tilted. Further, in the swing stopper mechanism 17, when the movable unit 5 is moved to the "+Z" direction by an external force, the swing stopper protruded part 87 is abutted with the holder ring-shaped part 62 to prevent the movable unit 5 from being further moved to the "+Z" direction.

(Posture Return Mechanism)

The posture return mechanism 12 includes the posture return magnetic members 15 and the swing drive magnets 14. As shown in FIG. 2, the posture return magnetic member 15 is disposed on an opposite side to the swing drive magnet 14 in the radial direction with the swing drive coil 13 interposed therebetween. When the holder 7 in the reference posture is viewed in the radial direction, the center of the posture return magnetic member 15 is located at a position overlapping with the magnetizing polarized line 14a of the swing drive magnet 14 located on the outer peripheral side. In other words, in a state that the movable unit 5 is set in the reference posture, an imaginary plane 12a perpendicular to the axial line "L" including the magnetizing polarized line 14a passes the center of the posture return magnetic member 15.

In this embodiment, when the movable unit 5 is tilted from the reference posture (when the optical axis of the optical module 2 is tilted with respect to the axial line "L"), the center of the posture return magnetic member 15 is displaced from the magnetizing polarized line 14a of the swing drive magnet 14 in the "Z"-axis direction. As a result, a magnetic attraction force is acted between the posture return magnetic member 15 and the swing drive magnet 14 in a direction so that the center of the posture return magnetic member 15 is moving toward a side where the magnetizing polarized line 14a of the swing drive magnet 14 is located. In other words, when the movable unit 5 is tilted from the reference posture, a magnetic attraction force is acted in a direction for returning the movable unit 5 to the reference posture between the posture return magnetic member 15 and the swing drive magnet 14. Therefore, the posture return magnetic member 15 and the swing drive magnet 14 function as the posture return mechanism structured to return the movable unit 5 to the reference posture.

(Second Unit)

Figure 9A:
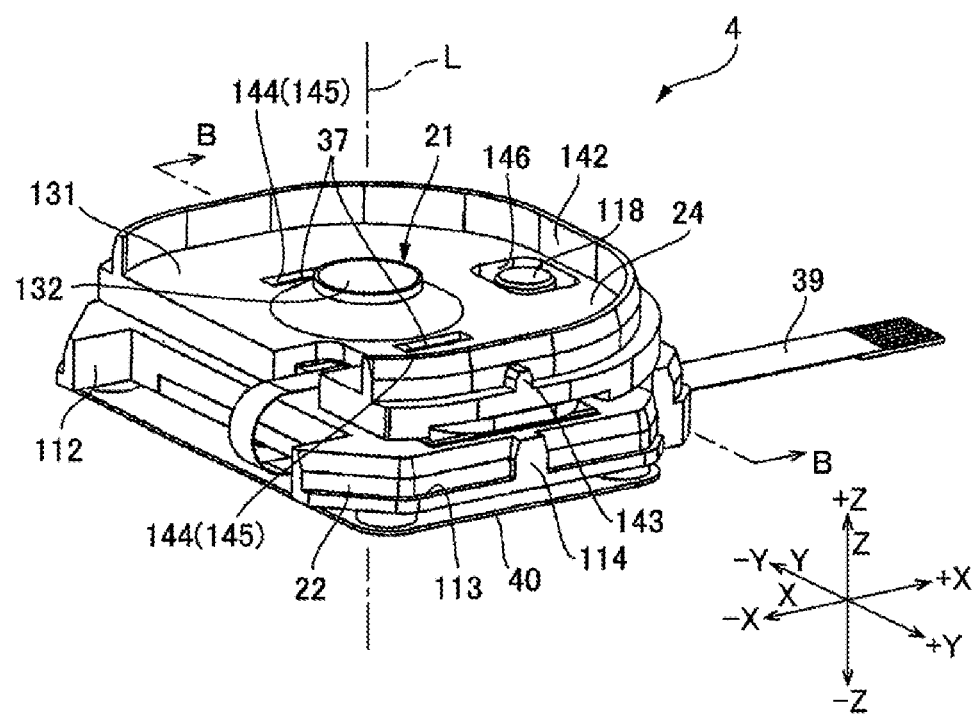
FIGS. 9A and 9B are perspective views showing a second unit which are viewed from an object side and an anti-object side.
Figure 9B:
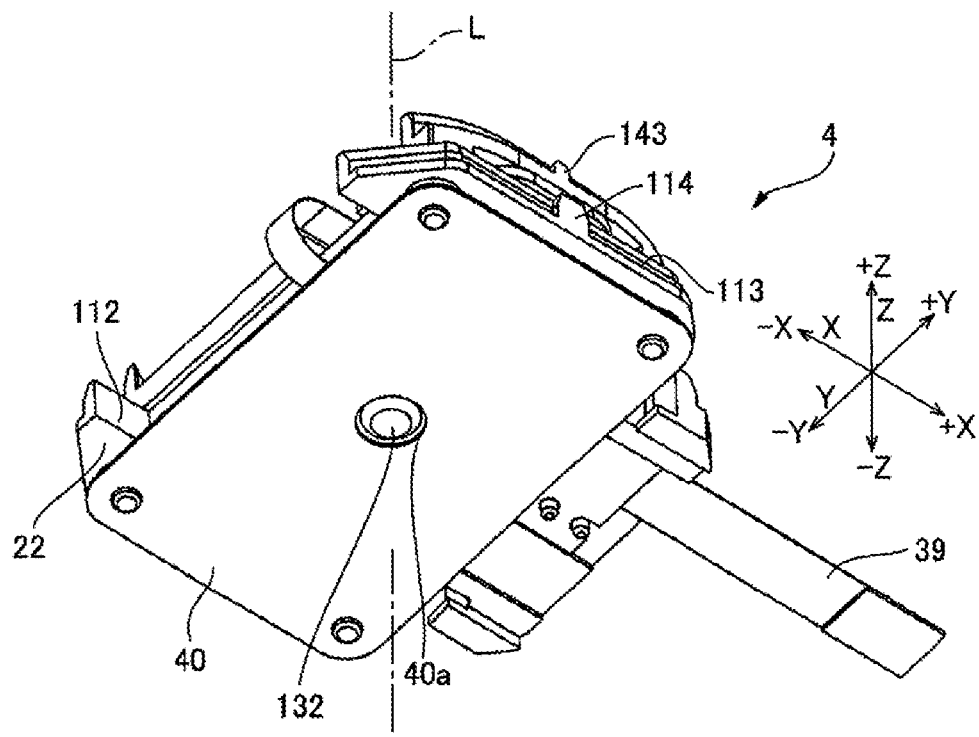
Figure 10:
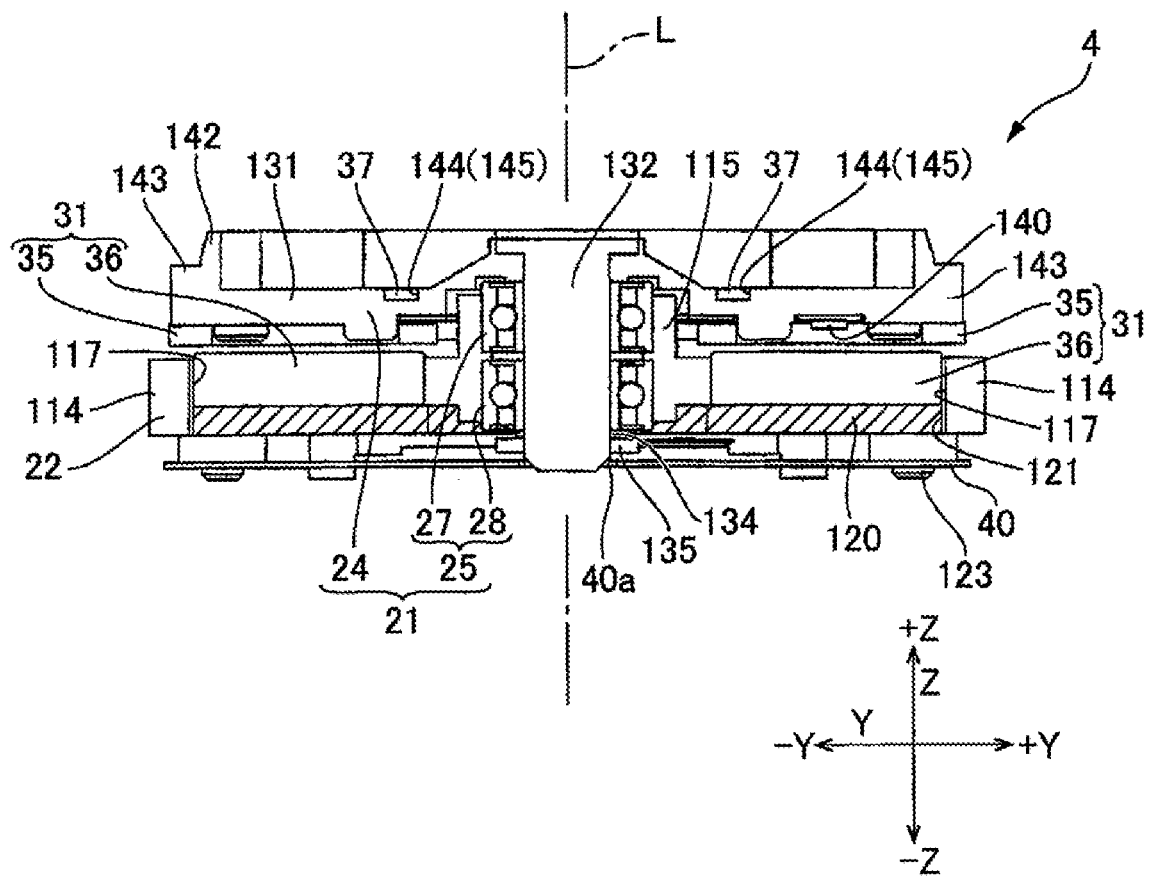
FIG. 10 is a cross-sectional view showing the second unit which is cut by the "B-B" line in FIG. 9A.
Figure 11:
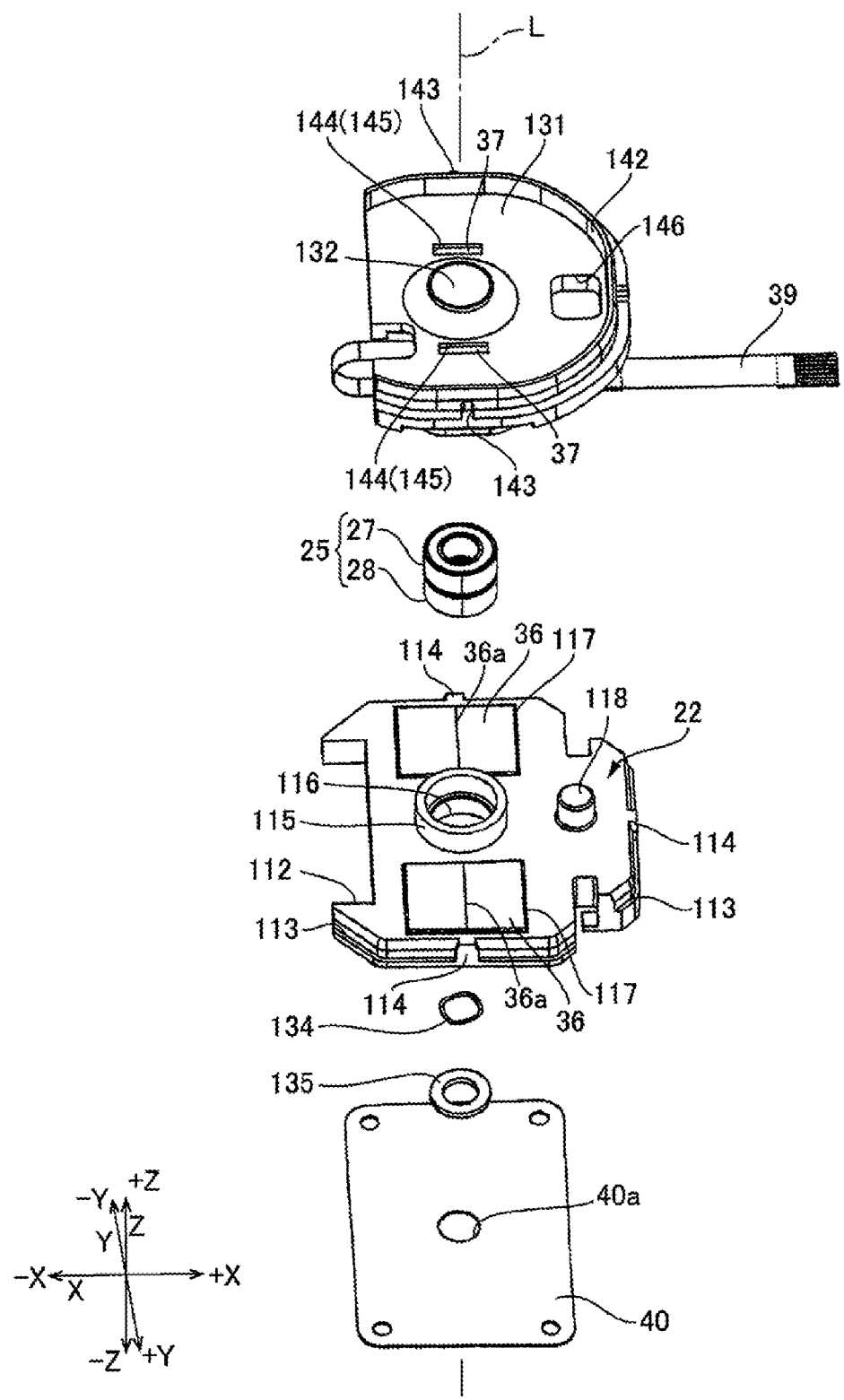
FIG. 11 is an exploded perspective view showing the second unit which is viewed from an object side.
Figure 12:
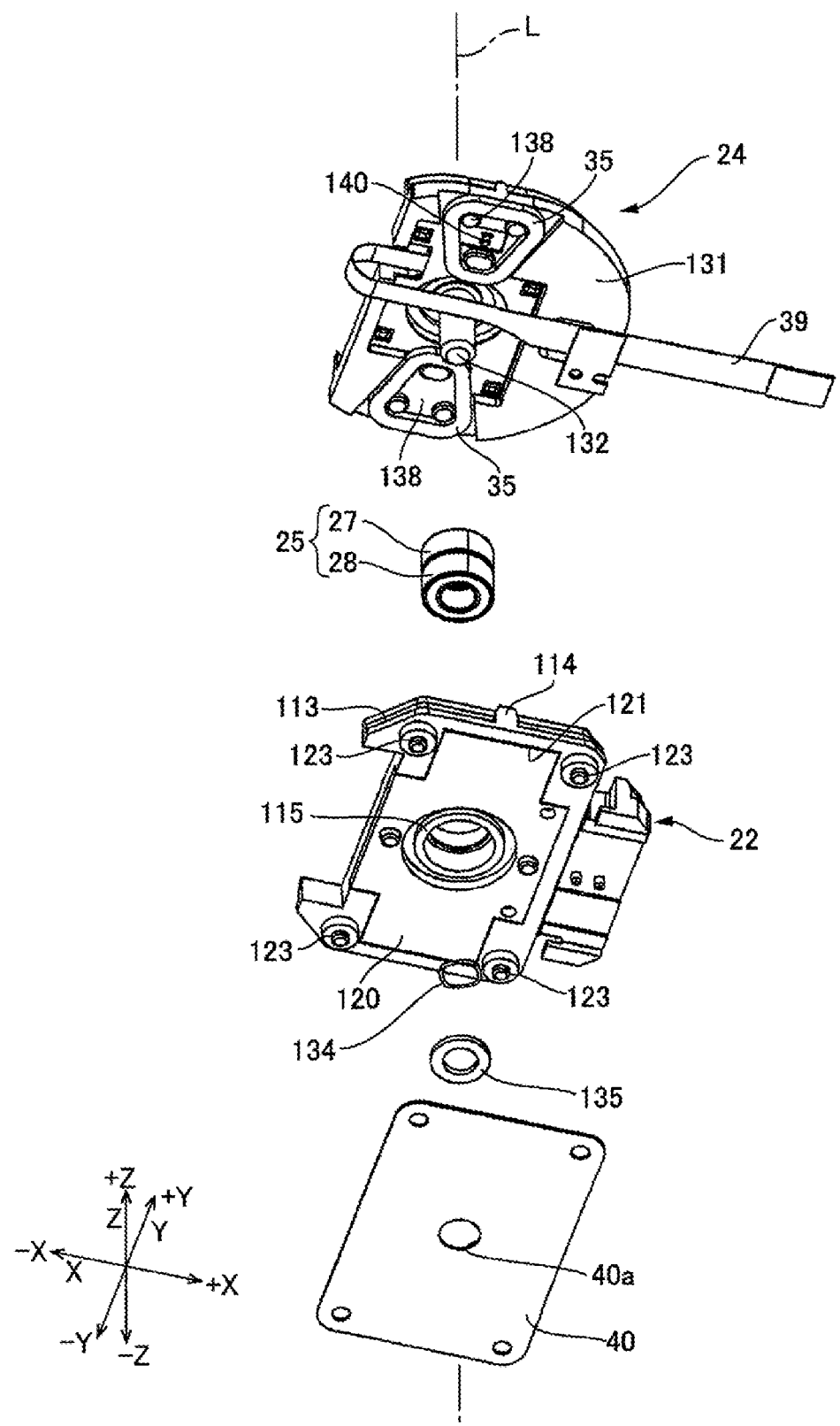
FIG. 12 is an exploded perspective view showing the second unit which is viewed from an anti-object side.
Figure 13:
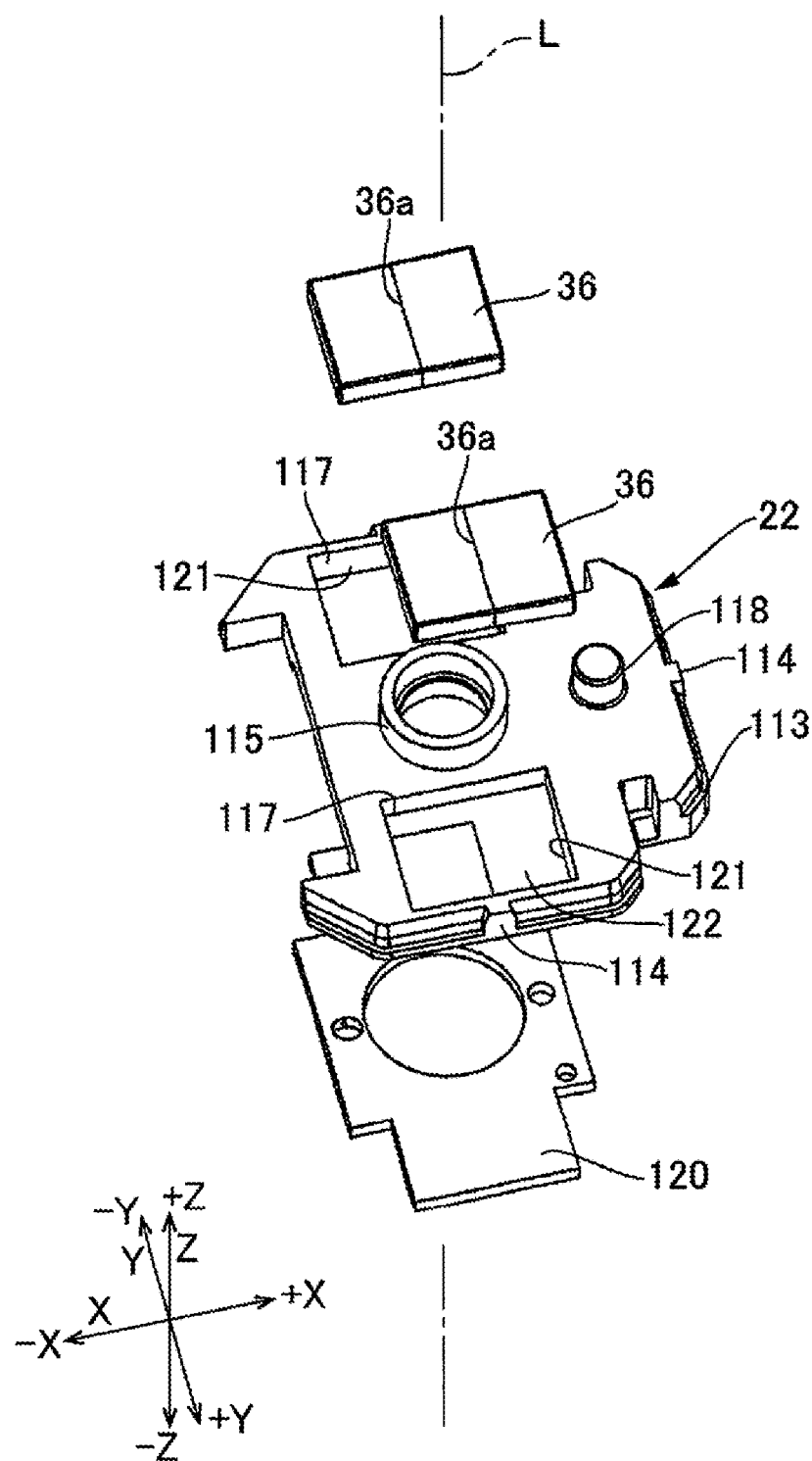
FIG. 13 is an exploded perspective view showing a fixing member viewed from an object side.

FIG. 9A is a perspective view showing the second unit 4 which is viewed from the "+Z" direction side and FIG. 9B is a perspective view showing the second unit 4 which is viewed from the "−Z" direction side. FIG. 10 is a cross-sectional view showing the second unit 4. FIG. 11 is an exploded perspective view showing the second unit 4 which is viewed from the "+Z" direction side (object side). FIG. 12 is an exploded perspective view showing the second unit 4 which is viewed from the "−Z" direction side (anti-object side). FIG. 13 is an exploded perspective view showing the fixing member 22, the rolling drive magnets 36 and the yoke 120. As shown in FIGS. 9A, 9B and 10, the second unit 4 includes the turnable support mechanism 21 which turnably supports the holder 7 around the axial line "L", the fixing member 22 which supports the holder 7 through the turnable support mechanism 21, the flexible printed circuit board 39 and the cover member 40. The turnable support mechanism 21 includes the turnable pedestal 24 and the bearing mechanism 25 (first ball bearing 27 and second ball bearing 28).

As shown in FIG. 11, the fixing member 22 is formed in a flat shape whose "Z"-axis direction is thin. The fixing member 22 is provided with a rectangular cut-out part 112 in an end edge portion in the "−X" direction. The fixing member 22 is provided with a step part 113 on an outer peripheral edge portion except the cut-out part 112. The step part 113 is provided with three protruded parts 114 which are respectively protruded to the "+X" direction, the "+Y" direction and the "−Y" direction.

As shown in FIGS. 11 and 12, the fixing member 22 formed in a flat plate shape is provided so as to face the pedestal main body 131 of the turnable pedestal 24 and is provided with a tube part 115 which is protruded to the "+Z" direction and the "−Z" direction in a center portion in the "Y"-axis direction. A center hole 116 of the tube part 115 penetrates through the fixing member 22 in the "Z"-axis direction. As shown in FIG. 10, the first ball bearing 27 and the second ball bearing 28 are held on an inner peripheral side of the tube part 115. In other words, the tube part 115 holds the bearing mechanism 25 and holds an outer ring of the first ball bearing 27 and an outer ring of the second ball bearing 28 from the outer peripheral side.

The fixing member 22 is, as shown in FIG. 11, provided with a pair of rolling drive magnet holding recessed parts 117 on an end face in the "+Z" direction. A pair of the rolling drive magnet holding recessed parts 117 is provided on both sides with the tube part 115 interposed therebetween. The rolling drive magnets 36 are respectively inserted and fixed to the rolling drive magnet holding recessed parts 117. Each of the rolling drive magnets 36 is protected by the fixing member 22 from an outer peripheral side. In this embodiment, the rolling drive magnet 36 is polarized and magnetized in the circumferential direction. A magnetizing polarized line 36a of each of the rolling drive magnets 36 is extended in a radial direction at a center in the circumferential direction of the rolling drive magnet 36. Further, the fixing member 22 is provided with a turning stopper protruded part 118 which is protruded to the "+Z" direction at a position separated from the tube part 115 in the "+X" direction. In other words, a turning stopper mechanism 38 (turning angle range restriction mechanism) described below which utilizes the turning stopper protruded part 118 is provided at a middle position in the circumferential direction with respect to a pair of the magnetic rolling drive mechanisms 31.

In addition, the fixing member 22 is, as shown in FIG. 12, provided with a yoke holding recessed part 121 on an end face in the "−Z" direction. The yoke holding recessed part 121 is provided so as to surround the tube part 115. The yoke holding recessed part 121 is extended in the "Y"-axis direction and, when viewed in the "Z"-axis direction, the yoke holding recessed part 121 is provided with an overlapped portion which is overlapped with a pair of the rolling drive magnet holding recessed parts 117. As shown in FIG. 13, the overlapped portion is a rectangular penetrating part 122 through which the rolling drive magnet holding recessed part 117 and the yoke holding recessed part 121 are communicated with each other in the "Z"-axis direction. The yoke 120 is inserted into the yoke holding recessed part 121 from the "−Z" direction side. The yoke 120 is formed of magnetic material. The yoke 120 is abutted with the rolling drive magnet 36 held by the rolling drive magnet holding recessed part 117 through the penetrating part 122 from the "−Z" direction side.

The fixing member 22 is, as shown in FIG. 12, provided with four plate spring fixing protruded parts 123 which are protruded to the "−Z" direction on an outer peripheral side with respect to the yoke holding recessed part 121. Two of the four plate spring fixing protruded parts 123 are provided in an end edge portion in the "+Y" direction of the fixing member 22 on both sides with the yoke holding recessed part 121 interposed therebetween in the "X"-axis direction. The other two of the four plate spring fixing protruded parts 123 are provided in an end edge portion in the "−Y" direction of the fixing member 22 on both sides with the yoke holding recessed part 121 interposed therebetween in the "X"-axis direction. The cover member 40 is fixed to the four plate spring fixing protruded parts 123 from the "−Z" direction side. The cover member 40 covers the yoke 120 from the "−Z" direction side. A circular opening part 40a is provided at a center of the cover member 40. As shown in FIG. 9B, when the cover member 40 is fixed to the fixing member 22, a tip end of a shaft part 132 is inserted into the opening part 40a.

The turnable pedestal 24 includes, as shown in FIG. 12, a pedestal main body 131 in a flat shape, which is thin in the "Z"-axis direction, and the shaft part 132 which is protruded from the pedestal main body 131 to the "−Z" direction. As shown in FIG. 10, the shaft part 132 is inserted into the first ball bearing 27 and the second ball bearing 28 which are held by the tube part 115 of the fixing member 22. In other words, the shaft part 132 is held by an inner ring of the first ball bearing 27 and an inner ring of the second ball bearing 28 from an outer peripheral side. Therefore, the turnable pedestal 24 is turnably held by the bearing mechanism 25 provided with the first ball bearing 27 and the second ball bearing 28 through the shaft part 132 around the axial line "L" with respect to the fixing member 22, which is the fixed body 42. The shaft part 132 is penetrated through the first ball bearing 27 and the second ball bearing 28 and its end portion is protruded from the second ball bearing 28 to the "−Z" direction. A spring washer 134 is fitted to a tip end portion of the shaft part 132. Further, a tip end portion of the shaft part 132 is fixed with a ring-shaped member 135 by welding or the like. In this embodiment, the spring washer 134 is compressed between the inner ring of the second ball bearing 28 and the ring-shaped member 135 to apply pressurization to the first ball bearing 27 and the second ball bearing 28.

As shown in FIG. 12, a face of the pedestal main body 131 facing the fixing member 22 is provided with a pair of coil fixed parts 138 on both sides with the shaft part 132 interposed therebetween. The rolling drive coils 35 are held by a pair of the coil fixed parts 138 in a posture that its center hole is directed in the "Z"-axis direction. A Hall element 140 is fixed on an inner side of one of the rolling drive coils 35 fixed to the coil fixed parts 138. The Hall element 140 is located at a center of the rolling drive coil 35 in the circumferential direction. The Hall element 140 is electrically connected with the flexible printed circuit board 39 which is electrically connected with the rolling drive coils 35.

As shown in FIG. 11, an end face on the "+Z" direction side of the pedestal main body 131 is provided with a peripheral wall 142 in a substantially U-shape in an outer peripheral edge portion located on an inner side by a constant width from an outer peripheral edge so as to surround the end face from the "+X" direction side and from both sides in the "Y"-axis direction. The peripheral wall 142 is provided with three protruded parts 143 which are respectively protruded to the "+X" direction, the "+Y" direction and the "−Y" direction.

An end face on the "+Z" direction side of the pedestal main body 131 is provided with fixed regions 144 for fixing an angular position return magnetic member 37 on both sides in the "Y"-axis direction with the tube part 115 interposed therebetween. The fixed region 144 is a groove 145 having a constant width which is extended in parallel to the "X"-axis direction. The angular position return magnetic member 37 is a quadrangular prism shape and its dimension in the circumferential direction ("X"-axis direction) is longer than its dimension in the radial direction. Further, a dimension in the circumferential direction ("X"-axis direction) of the angular position return magnetic member 37 is shorter than a dimension in the circumferential direction ("X"-axis direction) of the groove 145 and thus a fixed position of the angular position return magnetic member 37 can be changed and adjusted in the groove 145.

The angular position return magnetic member 37 is fixed to an inside of the groove 145 (inside the fixed region 144) in a posture that its longitudinal direction is directed in the circumferential direction. A fixed position of the angular position return magnetic member 37 is adjusted in an inside of the groove 145 (fixed region 144) so that, when a state that the turnable pedestal 24 is located at a predetermined reference angular position is viewed in the "Z"-axis direction, a center in the circumferential direction of the angular position return magnetic member 37 is overlapped, in other words, coincided with the magnetizing polarized line 36a of the rolling drive magnet 36 and, after that, the angular position return magnetic member 37 is fixed in the inside of the groove 145 (fixed region 144) with an adhesive.

In this embodiment, the pedestal main body 131 is provided with an opening part 146 at a position different from the magnetic member fixed region 144 in the circumferential direction. In this embodiment, the opening part 146 is provided at a position separated from the shaft part 132 to the "+X" direction.

(Magnetic Rolling Drive Mechanism)

As shown in FIGS. 9A, 9B and 10, when the turnable pedestal 24 is held by the fixing member 22 through the first ball bearing 27 and the second ball bearing 28, the magnetic rolling drive mechanism 31 is structured. As shown in FIG. 10, the magnetic rolling drive mechanism 31 is structured of a pair of magnetic rolling drive mechanisms 31 which are held on both sides with the shaft part 132 of the turnable pedestal 24 interposed therebetween. Each of the magnetic rolling drive mechanisms 31 includes the rolling drive coil 35 held by the turnable pedestal 24 and the rolling drive magnet 36 which is held by the fixing member 22 and faces the rolling drive coil 35 in the "Z"-axis direction. The rolling drive magnet 36 is divided into two pieces in the circumferential direction and magnetic poles of two faces of the rolling drive magnet 36 facing the rolling drive coil 35 are magnetized so as to be different from each other with the magnetizing polarized line 36a as a boundary. The rolling drive coil 35 is an air-core coil whose long side portions extended in the radial direction are utilized as an effective side. When the turnable pedestal 24 is located at a predetermined reference angular position, the Hall element 140 faces the magnetizing polarized line 36a of the swing drive magnet 14 disposed on the "−Z" direction side.

(Turning Stopper Mechanism)

When the turnable pedestal 24 is held by the fixing member 22 through the first ball bearing 27 and the second ball bearing 28, as shown in FIG. 9A, the turning stopper protruded part 118 of the fixing member 22 is inserted into the opening part 146 of the turnable pedestal 24. As a result, the turning stopper protruded part 118 of the fixing member 22 and the opening part 146 of the turnable pedestal 24 structure a turning stopper mechanism 38 (turning angle range restriction mechanism) which is structured to restrict a turnable angular range around the "Z"-axis of the turnable pedestal 24. The turnable pedestal 24 can be turned around the "Z"-axis in a region that the turning stopper protruded part 118 is permitted by an inner peripheral wall (abutting part) of the opening part 146. In other words, the turning stopper mechanism 38 restricts a turnable angular range of the turnable pedestal 24 by making the inner peripheral wall of the opening part 146 abut with the turning stopper protruded part 118 in the circumferential direction. The turning stopper mechanism 38 which is the turning angle range restriction mechanism is structured by inserting the turning stopper protruded part 118 into the opening part 146 between the fixing member 22 and the turnable pedestal 24.

(Angular Position Return Mechanism)

Figure 14A:
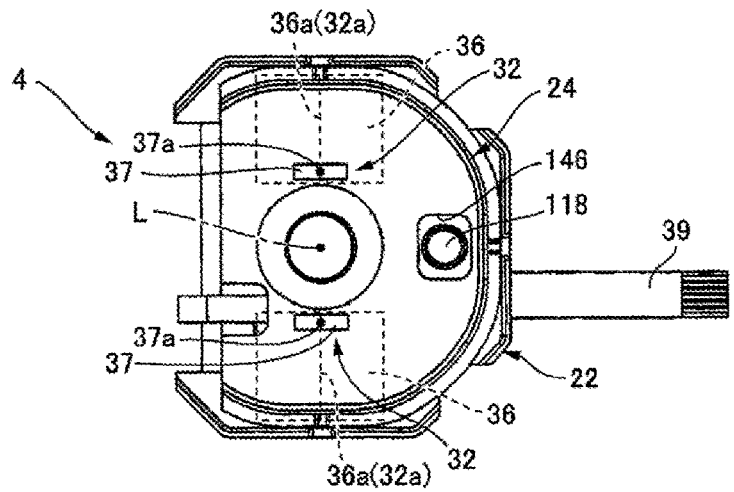
FIGS. 14A, 14B and 14C are explanatory views showing an angular position return mechanism.
Figure 14B:
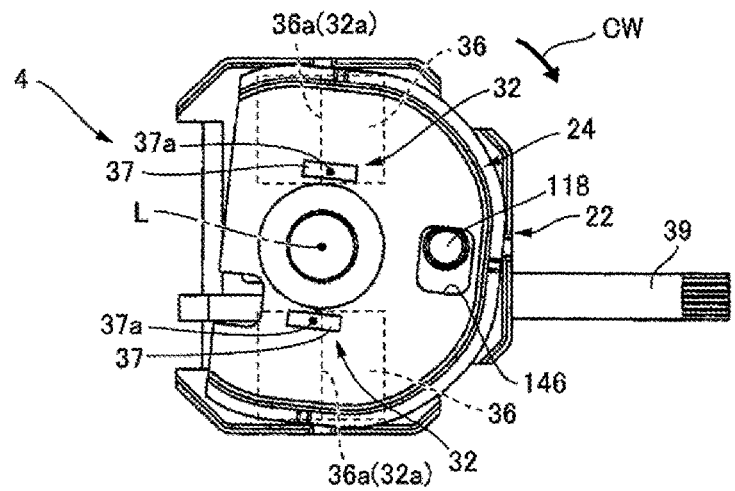
Figure 14C:
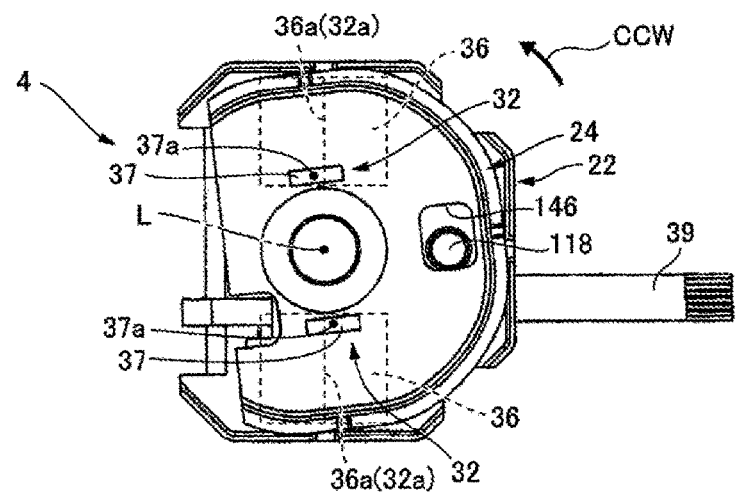

FIGS. 14A, 14B and 14C are explanatory views showing the angular position return mechanism 32. As shown in FIGS. 14A, 14B and 14C, the angular position return mechanism 32 includes the angular position return magnetic members 37 and the rolling drive magnets 36. As shown in FIG. 10, the angular position return magnetic member 37 is disposed to an opposite side to the rolling drive magnet 36 with the rolling drive coil 35 interposed therebetween in the "Z"-axis direction. Further, as shown in FIG. 14A, in a state that the turnable pedestal 24 is turnably supported by the fixing member 22 through the bearing mechanism 25, when a state that the turnable pedestal 24 is located at the reference angular position is viewed in the "Z"-axis direction, the center 37a in the circumferential direction of the angular position return magnetic member 37 is located at a position overlapping with, in other words, coincided with the magnetizing polarized line 36a of the rolling drive magnet 36 disposed on the "−Z" direction side. In other words, in a state that the turnable pedestal 24 is located at the reference angular position, an imaginary plane 32a which is parallel to the axial line "L" including the magnetizing polarized line 36a passes the center 37a of the angular position return magnetic member 37.

Next, as shown in FIGS. 14B and 14C, when the turnable pedestal 24 is turned to the "CW" direction or to the "CCW" direction from the reference angular position, the center 37a of the angular position return magnetic member 37 is displaced in the circumferential direction from the magnetizing polarized line 36a of the rolling drive magnet 36. As a result, a magnetic attraction force is acted between the angular position return magnetic member 37 and the rolling drive magnet 36 in a direction that the center 37a of the angular position return magnetic member 37 is moved to the magnetizing polarized line 36a side of the rolling drive magnet 36. In other words, when the turnable pedestal 24 is turned from the reference angular position, a magnetic attraction force in a direction for returning the turnable pedestal 24 to the reference angular position is acted between the angular position return magnetic member 37 and the rolling drive magnet 36. Therefore, the angular position return magnetic member 37 and the rolling drive magnet 36 function as an angular position return mechanism 32 which is structured to return the turnable pedestal 24 to the reference angular position.

In the state shown in FIG. 14B, the inner peripheral wall of the opening part 146 of the turnable pedestal 24 is abutted with the turning stopper protruded part 118 of the fixing member 22 from one side in the circumferential direction to restrict further turning of the turnable pedestal 24 to the "CW" direction. Further, in the state shown in FIG. 14C, the inner peripheral wall of the opening part 146 of the turnable pedestal 24 is abutted with the turning stopper protruded part 118 of the fixing member 22 from the other side in the circumferential direction to restrict further turning of the turnable pedestal 24 to the "CCW" direction. Therefore, the turnable pedestal 24 is capable of being turned in an angular range between the angular position shown in FIG. 14B and the angular position shown in FIG. 14C.

In this embodiment, as shown in FIGS. 14A through 14C, when the turnable pedestal 24 is turned within the predetermined angular range, the angular position return magnetic member 37 is overlapped with the imaginary plane 32a which is extended in parallel to the axial line "L" and including the magnetizing polarized line 36a of the rolling drive magnet 36, and the angular position return magnetic member 37 is not separated from the imaginary plane 32a. In other words, a length dimension in the circumferential direction of the angular position return magnetic member 37 is set so that, even when the turnable pedestal 24 is turned in the predetermined turnable angular range, the angular position return magnetic member 37 always faces the magnetizing polarized line 36a of the rolling drive magnet 36. Therefore, according to the angular position return mechanism 32, a magnetic attraction force can be surely generated in a direction for returning the center 37a of the angular position return magnetic member 37 to the position overlapping with the magnetizing polarized line 36a. Accordingly, the movable unit 5 can be surely returned to the reference angular position.

(Attaching First Unit to Second Unit)

In this embodiment, when the first unit 3 is to be attached to the second unit 4, the peripheral wall 142 of the second unit 4 is inserted into a lower end portion of the holder body part 63 of the holder 7, and the protruded parts 143 protruded from the peripheral wall 142 of the second unit 4 are inserted into the positioning cut-out parts 67 provided in the holder body part 63. Therefore, the holder 7 is fixed to the turnable pedestal 24 in a state positioned in the radial direction and the circumferential direction. Further, when the first unit 3 is to be attached to the second unit 4, a portion on the "+Z" direction side of the step part 113 on an outer peripheral edge of the fixing member 22 is inserted to a lower end portion of the tube-shaped case 45, and the protruded parts 114 provided in the step part 113 are inserted into the positioning cut-out parts 56 provided in the tube-shaped case 45. Therefore, the case body 8 is fixed to the fixing member 22 in a state positioned in the radial direction and the circumferential direction to structure the fixed body 42. In this manner, the optical unit 1 is completed.

(Shake Correction of Optical Unit)

The optical unit 1 includes, as described above, the magnetic swing drive mechanism 11 structured so that the first unit 3 performs a shake correction around the "X"-axis and a shake correction around the "Y"-axis. Therefore, shake corrections in the pitching (vertical swing) direction and the yawing (lateral swing) direction can be performed. Further, the second unit 4 of the optical unit 1 includes the magnetic rolling drive mechanism 31 which is structured to turn the holder 7 of the first unit 3 and thus, a shake correction in the rolling direction can be performed. In this embodiment, the optical unit 1 includes a gyroscope in the movable unit 5 and thus shakes around three axes perpendicular to each other are detected by the gyroscope and the magnetic swing drive mechanism 11 and the magnetic rolling drive mechanism 31 are driven so as to cancel the detected shake.

(Operations and Effects)

In the optical unit 1 in accordance with this embodiment, the angular position return mechanism 32 structured to return the optical module 2 (holder 7) to the reference angular position around the "Z"-axis is structured by the angular position return magnetic member 37 and the rolling drive magnet 36. Therefore, a plate spring or the like is not required to be provided between the holder 7 and the fixing member 22 for returning the optical module 2 (holder 7) to the reference angular position. Accordingly, a movable range of the angular position return plate spring is not required to be secured and thus the size of the device can be reduced.

Further, in this embodiment, the angular position return magnetic member 37 is disposed on an opposite side to the rolling drive magnet 36 with the rolling drive coil 35 interposed therebetween in the "Z"-axis direction. Therefore, the angular position return magnetic member 37 functions as a back yoke and thus torque for turning the movable unit 5 by the magnetic rolling drive mechanism 31 can be increased.

Further, the angular position return magnetic member 37 is disposed on an opposite side to the rolling drive magnet 36 with the rolling drive coil 35 interposed therebetween. Therefore, a distance between the angular position return magnetic member 37 and the rolling drive magnet 36 can be secured relatively longer. As a result, linearity of a magnetic attraction force generated between the angular position return magnetic member 37 and the rolling drive magnet 36 is easily secured with respect to an angle that the movable unit 5 is turned. In other words, in a case that the rolling drive magnet 36 and the angular position return magnetic member 37 are arranged to be too close to each other, when a turned angle of the movable body 41 becomes large, a magnetic attraction force may abruptly become weak. On the other hand, when a distance between the rolling drive magnet 36 and the angular position return magnetic member 37 is secured, such an abrupt variation of a magnetic attraction force can be prevented or suppressed.

In addition, a dimension in the circumferential direction of the angular position return magnetic member 37 is longer than that in the radial direction. Therefore, when the movable unit 5 is turned in the predetermined angular range with the reference angular position as a center, it is easily structured that the angular position return magnetic member 37 is not separated from the imaginary plane 32a. Further, a shape of the angular position return magnetic member 37 is formed so that a dimension in the circumferential direction is set to be longer than that in the radial direction. Therefore, linearity of a magnetic attraction force generated between the angular position return magnetic member 37 and the rolling drive magnet 36 is easily secured with respect to an angle that the movable unit 5 is turned.

Further, in this embodiment, the angular position return magnetic member 37 is fixed after a fixed position of the angular position return magnetic member 37 is adjusted in the fixed region 144 (groove 145) provided in the turnable pedestal 24. In other words, the turnable pedestal 24 is provided with the fixed region 144 for fixing the angular position return magnetic member 37, and a fixed position of the angular position return magnetic member 37 can be changed in the fixed region 144. Therefore, the reference angular position of the movable unit 5 can be determined by changing the fixed position of the angular position return magnetic member 37 in the fixed region 144. Further, the fixed position of the angular position return magnetic member 37 is changed in the fixed region 144 and thus, when the movable body 41 is turned, a magnitude of a magnetic attraction force generated between the angular position return magnetic member 37 and the rolling drive magnet 36 can be changed.

In addition, in this embodiment, a pair of the magnetic rolling drive mechanisms 31 which are held on both sides with the shaft part 132 of the turnable pedestal 24 interposed therebetween is provided as the magnetic rolling drive mechanism 31, and two angular position return magnetic members 37 which are attracted by the rolling drive magnets 36 of the respective magnetic rolling drive mechanisms 31 are provided. Therefore, the movable body 41 can be surely returned to the reference angular position.

Further, in this embodiment, the rolling drive coil 35 and the rolling drive magnet 36 which structure the magnetic rolling drive mechanism 31 are faced each other in the "Z"-axis direction and thus the optical unit 1 (second unit 4) is restrained from being enlarged in the radial direction.

In accordance with an embodiment of the disclosure, a magnetic attraction force generated between the angular position return magnetic member 37 and the rolling drive magnet 36 can be increased by increasing a width dimension in the radial direction of the angular position return magnetic member 37. Further, a magnitude of a magnetic attraction force generated between the angular position return magnetic member 37 and the rolling drive magnet 36 can be changed by changing a thickness of the angular position return magnetic member 37. In addition, a magnetic attraction force generated between the angular position return magnetic member 37 and the rolling drive magnet 36 can be adjusted by changing a fixed position of the angular position return magnetic member 37 in the radial direction.

Modified Embodiments

Figure 15:
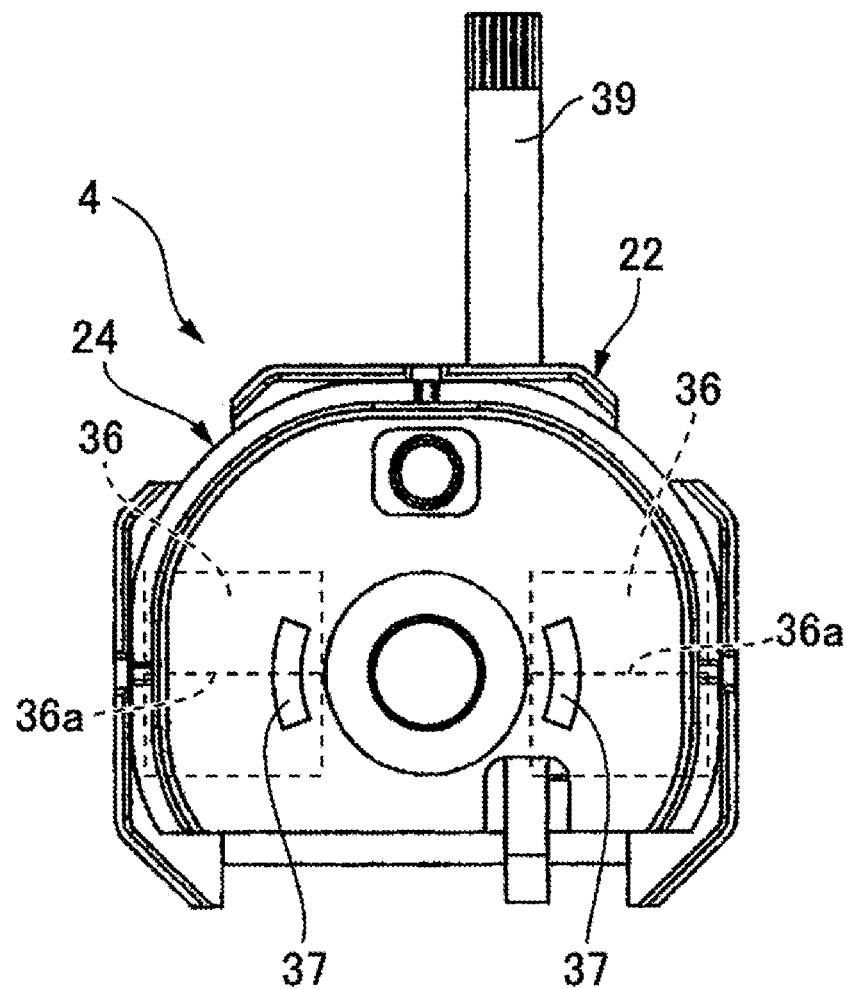
FIG. 15 is an explanatory view showing an angular position return mechanism in accordance with a modified embodiment.
Figure 16:
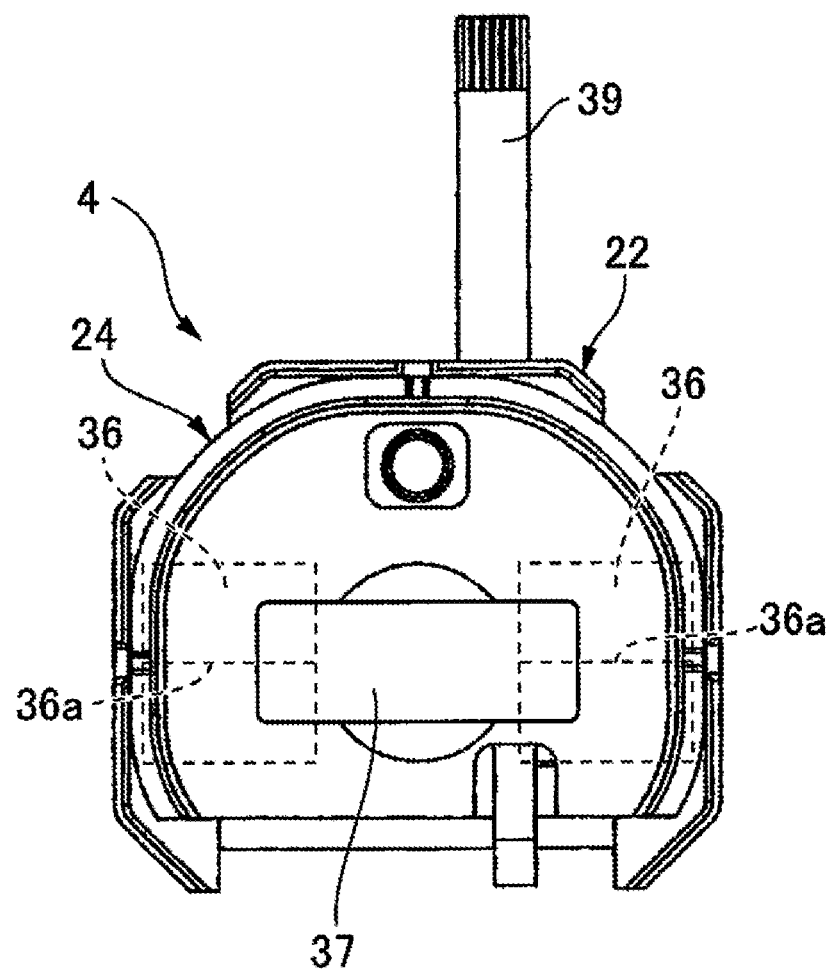
FIG. 16 is an explanatory view showing an angular position return mechanism in accordance with another modified embodiment.

FIGS. 15 and 16 are explanatory views showing angular position return magnetic members in accordance with modified embodiments. In the embodiment described above, the angular position return magnetic member 37 is formed in a quadrangular prism shape, but it may be formed in a circular column shape or a plate shape. Further, in the embodiment described above, the angular position return magnetic member 37 is extended in a straight shape, but it may be formed in a circular arc shape as shown in FIG. 15. According to this structure, linearity of a magnetic attraction force generated between the angular position return magnetic member 37 and the rolling drive magnet 36 can be easily secured with respect to an angle that the movable unit 5 is turned.

Further, in the embodiment described above, two angular position return magnetic members 37 are disposed so as to interpose the shaft part 132 therebetween. However, as shown in FIG. 16, the two angular position return magnetic members 37 may be structured of one angular position return magnetic member 37. In other words, one angular position return magnetic member 37 may be used which is formed in a rectangular plate shape so as to include two angular position return magnetic members 37.

In addition, in the embodiment described above, a fixed position of the angular position return magnetic member 37 is changed in the groove 145 which is the fixed region 144. However, for example, it may be structured that two ribs extended in parallel to the "+Z" direction are provided on a surface of the turnable pedestal and a fixed position of the angular position return magnetic member 37 is moved in the "X"-axis direction in a space between the two ribs as a fixed region.

In accordance with an embodiment of the disclosure, a structure may be adopted that the rolling drive coil 35 and the rolling drive magnet 36 structuring the magnetic rolling drive mechanism 31 are faced each other in a radial direction. Also in this case, when an angular position return magnetic member 37 is fixed to a member to which the rolling drive coil 35 is fixed, the angular position return mechanism 32 is structured. Further, also in this case, the angular position return magnetic member 37 is disposed so that an imaginary plane 32a which includes a magnetizing polarized line 36a of the rolling drive magnet 36 and is parallel to the axial line "L" (imaginary plane 32a including the magnetizing polarized line 36a and the axial line "L") passes a center of the angular position return magnetic member 37 when the movable body 41 is located at the reference angular position.

While the description above refers to particular embodiments of the disclosure, it will be understood that many modifications may be made without departing from the spirit thereof. The accompanying claims are intended to cover such modifications as would fall within the true scope and spirit of the disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising an optical element;
    a turnable support mechanism structured to turnably support the movable body around an optical axis of the optical element;
    a fixed body which supports the movable body through the turnable support mechanism;
    a magnetic rolling drive mechanism structured to turn the movable body; and
    an angular position return mechanism structured to return the movable body to a reference angular position around the optical axis;
    wherein the movable body comprises:
    an optical module comprising the optical element;
    a swing support mechanism structured to swingably support the optical module;
    a support body which supports the optical module through the swing support mechanism; and
    a magnetic swing drive mechanism structured to swing the optical module;
    wherein the turnable support mechanism turnably supports the support body;
    wherein the fixed body supports the movable body through the turnable support mechanism and the support body;
    wherein the swing support mechanism swingably supports the optical module between a reference posture in which an axial line previously set and the optical axis of the optical element are coincided with each other and a tilted posture in which the optical axis is tilted with respect to the axial line;

wherein the magnetic swing drive mechanism, which is structured between the optical module and the fixed body, comprises:
a first magnetic swing drive mechanism structured to turn the optical module around a "Y"-axis perpendicular to the axial line; and
a second magnetic swing drive mechanism structured to turn the optical module around an "X"-axis perpendicular to the axial line and the "Y"-axis, and
the turnable support mechanism comprises:
a turnable pedestal comprising a pedestal main body to which the support body is attached and a shaft part protruded from the pedestal main body in a direction of the axial line; and
a bearing mechanism which turnably holds the turnable pedestal with respect to the fixed body through the shaft part;
wherein the magnetic rolling drive mechanism comprises:
a coil which is fixed to one of the movable body and the fixed body; and
a magnet which is fixed to the other of the movable body and the fixed body so as to face the coil;
wherein the magnet is polarized and magnetized in a circumferential direction;
wherein the angular position return mechanism comprises a magnetic member which is attached to the one of the movable body and the fixed body to which the coil is fixed; and
wherein when the movable body is located at the reference angular position, an imaginary plane which includes a magnetizing polarized line of the magnet and is parallel to the optical axis passes a center of the magnetic member.

2. The optical unit with a shake correction function according to claim 1, wherein
the magnetic rolling drive mechanism is structured to turn the movable body in a predetermined angular range with the reference angular position as a center, and
at least a part of the magnetic member is overlapped with the imaginary plane when the movable body is turned in the predetermined angular range.

3. The optical unit with a shake correction function according to claim 1, wherein
the coil and the magnet are faced each other in the optical axis direction, and
the magnetic member is located on an opposite side to the magnet with the coil interposed therebetween in the optical axis direction.

4. The optical unit with a shake correction function according to claim 3, wherein
the magnetic member is disposed at a position separated from the optical axis, and
a dimension in the circumferential direction of the magnetic member is longer than a dimension in a radial direction of the magnetic member.

5. The optical unit with a shake correction function according to claim 3, wherein
the one of the movable body and the fixed body to which the coil is fixed comprises a fixed region to which the magnetic member is to be fixed, and
a fixed position of the magnetic member is capable of being changed in the fixed region.

6. The optical unit with a shake correction function according to claim 3, further comprising a turning angle range restriction mechanism structured to restrict a turnable angular range of the movable body,
wherein the turning angle range restriction mechanism comprises:
a protruded part which is protruded from one of the movable body and the fixed body toward the other of the movable body and the fixed body; and
an abutting part which is provided in the other of the movable body and the fixed body so as to be capable of abutting with the protruded part in the circumferential direction around the optical axis.

7. The optical unit with a shake correction function according to claim 3, wherein
the magnetic rolling drive mechanism comprises a first magnetic rolling drive mechanism and a second magnetic rolling drive mechanism which are disposed at different angular positions around the optical axis, and
the magnetic member comprises:
a first magnetic member which is attached to the one of the movable body and the fixed body to which the coil of the first magnetic rolling drive mechanism is fixed; and
a second magnetic member which is attached to the one of the movable body and the fixed body to which the coil of the second magnetic rolling drive mechanism is fixed.

8. The optical unit with a shake correction function according to claim 1, further comprising a turning angle range restriction mechanism structured to restrict a turnable angular range of the movable body,
wherein the turning angle range restriction mechanism comprises:
a protruded part which is protruded from one of the movable body and the fixed body toward the other of the movable body and the fixed body; and
an abutting part which is provided in the other of the movable body and the fixed body so as to be capable of abutting with the protruded part in the circumferential direction around the optical axis.

9. The optical unit with a shake correction function according to claim 8, wherein
the magnetic rolling drive mechanism is structured to turn the movable body in a predetermined angular range with the reference angular position as a center, and
at least a part of the magnetic member is overlapped with the imaginary plane when the movable body is turned in the predetermined angular range.

10. The optical unit with a shake correction function according to claim 1, wherein
the magnetic rolling drive mechanism comprises a first magnetic rolling drive mechanism and a second magnetic rolling drive mechanism which are disposed at different angular positions around the optical axis, and
the magnetic member comprises:
a first magnetic member which is attached to the one of the movable body and the fixed body to which the coil of the first magnetic rolling drive mechanism is fixed; and
a second magnetic member which is attached to the one of the movable body and the fixed body to which the coil of the second magnetic rolling drive mechanism is fixed.

11. The optical unit with a shake correction function according to claim 1, wherein
the fixed body comprises:
a tube part which holds the bearing mechanism turnably holding the shaft part protruded from the pedestal main body; and a fixing member which is provided so as to face the pedestal main body, a face of the pedestal main body which faces the fixing member holds a rolling drive coil which is the coil, and the fixing member is fixed with a rolling drive magnet which is the magnet so as to face the rolling drive coil.

12. The optical unit with a shake correction function according to claim 11, wherein the pedestal main body comprises an angular position return magnetic member which is the magnetic member on an opposite side to the rolling drive magnet with the rolling drive coil interposed therebetween in the direction of the axial line at a position where the angular position return magnetic member is overlapped with the rolling drive magnet when viewed in the direction of the axial line.

13. The optical unit with a shake correction function according to claim 12, wherein the rolling drive coil and the rolling drive magnet are respectively provided at two positions with the tube part interposed therebetween, and the angular position return magnetic member is provided at positions overlapped with the respective rolling drive magnets.

14. The optical unit with a shake correction function according to claim 12, wherein the pedestal main body comprises a fixed region to which the angular position return magnetic member is to be fixed, a fixed position of the angular position return magnetic member is capable of being changed in the fixed region, and when a state that the movable body is located at the reference angular position is viewed in the direction of the axial line, a position of the angular position return magnetic member is adjusted so that a center of the angular position return magnetic member is coincided with a magnetizing polarized line of the rolling drive magnet and the angular position return magnetic member is fixed.

15. The optical unit with a shake correction function according to claim 12, further comprising a turning angle range restriction mechanism structured to restrict a turnable angular range of the turnable pedestal, wherein the turning angle range restriction mechanism is structured so that a turning stopper protruded part is inserted into an opening part between the fixing member and the turnable pedestal.

16. The optical unit with a shake correction function according to claim 12, further comprising a turning angle range restriction mechanism structured to restrict a turnable angular range of the turnable pedestal, wherein a dimension in the circumferential direction of the angular position return magnetic member is set so that the angular position return magnetic member always faces a magnetizing polarized line of the rolling drive magnet when the turnable pedestal is turned in the turnable angular range.

\* \* \* \* \*